United States Patent [19]

Koza

[11] Patent Number: 4,935,877
[45] Date of Patent: Jun. 19, 1990

[54] NON-LINEAR GENETIC ALGORITHMS FOR SOLVING PROBLEMS

[76] Inventor: John R. Koza, 2961 Industrial Rd. - No. 612, Las Vegas, Nev. 89109

[21] Appl. No.: 196,973

[22] Filed: May 20, 1988

[51] Int. Cl.⁵ .......................................... G06F 15/18
[52] U.S. Cl. .................................. 364/513; 364/200; 364/274
[58] Field of Search ..................... 364/513, 200, 274; 382/14, 15

[56] References Cited

U.S. PATENT DOCUMENTS

| | | | |
|---|---|---|---|
| 4,479,241 | 10/1984 | Buekley | 364/513 |
| 4,675,829 | 6/1987 | Clemenson | 364/513 |
| 4,697,242 | 9/1987 | Holland et al. | 364/513 |
| 4,821,333 | 4/1989 | Gillies | 382/41 |

OTHER PUBLICATIONS

Cramer, Michael Lynn, "A Representation for the Adaptive Generation of Simple Sequential Programs", *Grefenstette: Proceedings of First Internaional Conference on Genetic Algorithms*, 1985.

DeJong, Kenneth, "On Using Genetic Algorithms to Search Program Spaces", *Grefenstette: Proceedings of Second International Conference on Genetic Algorithms*, 1987.

Fujiki, Cory and Dickinson, John, "Using the Genetic Algorithm to Generate Lisp Source Code to Solve the Prisoner's Dilemma", *Grefenstette: Proceedings of Second International Conference on Genetic Algorithms*, 1987.

Dress, W. B., "Darwinian Optimization of Synthetic Neural Systems", *IEEE First International Conference on Neural Networks*, San Diego, Jun. 1987, vol. No. 3, pp. 769-775.

Fujiki, C. and Dickinson, J., *Genetic Algorithms and Their Applications: Proceedings of the Second International Conference on Genetic Algorithms*, Cambridge, U.S.A., Jul. 1987, pp. 236-240.

Sannier, A. V. and Goodman, E. D., *Genetic Algorithms and Their Applications: Proceedings of the Second International Conference on Genetic Algorithms*, Cambridge, U.S.A., Jul. 1987, pp. 162-169.

Grefenstette, John J. (Editor)–*Proceedings of an International Conference on Genetic Algorithms and Their Applications*, Pittsburgh 1985.

Grefenstette, John J.(Editor)–*Genetic Algorithms and Their Applications; Proceedings of the Second International Conference on Genetic Algorithms*, Lawrence Erlbaum Associates, Hillsdale, New Jersey, 1987.

Hicklin, Joseph F.–*Application of the Genetic Algorithm to Automatic Program Generation*, Master of Science Thesis, Department of Computer Science, University of Idaho, 1986.

Holland, John H.–*Adaptation in Natural and Artificial Systems;* The University of Michigan Press, Ann Arbor, 1975.

Holland, J. H., and Reitman, J. S. (1978), Cognitive Systems Based on Adaptive Algorithms, in D. A. Waterman and F. Hayes-Roth (Eds.), *Pattern Directed Inference Systems* (pp. 313-329), New York: Academic Press.

Lawler, E. L., Lenstra, J. K., Rinnooy Kan, A. H. G., and Shmoys, D. B. *The Traveling Salesman Problem*, John Wiley & Sons, New York, 1986.

*Primary Examiner*—John R. Lastova
*Attorney, Agent, or Firm*—Blakely, Sokoloff, Taylor & Zafman

[57] ABSTRACT

The present invention is a non-linear genetic algorithm for problem solving. The iterative process of the present invention operates on a population of problem solving entities. First, the activated entities perform, producing results. Then the results are assigned values and associated with the producing entity. Next, entities having relatively high associated values are selected. The selected entities perform either crossover, reproduction, or permutation operations. Lastly, the newly created entities are added to the population.

44 Claims, 11 Drawing Sheets

Parent 1

( — ( * A11 A12 A21 ) B1 )
500

Parent 2

( — A22 B2 )
520

Offspring 1

( — ( * A11 A12 A21 ) B2 )
540

Offspring 2

( — A22 B1 )
560

First Linear Equation: $a_{11}x_1 + a_{12}x_2 = b_1$    310

Second Linear Equation: $a_{21}x_1 + a_{22}x_2 = b_2$    350 with the condition: $a_{11}a_{22} - a_{21}a_{12} = 1$

NON-LINEAR GENETIC ALGORITHMS FOR SOLVING PROBLEMS

BACKGROUND OF THE INVENTION

1. The Field of the Invention

The field of the invention is that of generic algorithms. More specifically, the field is genetic algorithms useful for problem solving.

2. The Prior Art

Genetic algorithms provide a method of improving a given set of objects. The processes of natural selection and survival of the fittest provide a theoretical base. Genetic algorithms in their conventional form can solve many problems. However, the problem of the Prisoner's Dilemma illustrates the limitations of conventional genetic algorithms.

The Prisoner's Dilemma is a well-researched problem in game theory (with numerous psychological, sociological, and geopolitical interpretations) in which two players can either cooperate or not cooperate. The players make their moves simultaneously and without communication. Each player then receives a payoff that depends on his move and the move of the other player.

The payoffs in the Prisoner's Dilemma game are arranged so that a non-cooperative choice by one player always yields that player a greater payoff than a cooperative choice (regardless of what the other player does). However, if both players are selfishly non-cooperative, they are both worse off than if they had both cooperated. The game is not a "zero sum game" because, among other things, both players are better off if they both cooperate.

Applying the conventional genetic algorithm to a specific problem requires that a representation scheme be created to represent possible solutions to the problem as an individual chromosome amongst a large population of chromosomes. In the Prior Art, each individual chromosome in this population must take the form of a character string over a fixed alphabet, most typically a presentation of 0's and 1's (i.e. binary "bits") of the same length. The creation of this representation scheme (coding scheme) is an inherent part of the conventional genetic algorithm because the codes undergo manipulation when the genetic algorithm is actually applied.

In the case of a game, an individual in this population is a particular "strategy" for playing the game. A "strategy" for a given player in a game is a way of specifying what move the player is to make at a particular point in a game given all the allowable moves and information about the state of the game which is available to the player. In the case of the Prisoner's Dilemma game, the allowable moves for a particular player are always the same two alternatives—the player can cooperate or not. The information available to the player consists of the history of previous moves from the beginning of the game.

The chapter concerning game playing entitled "The Evolution of Strategies in the Iterated Prisoner's Dilemma" by Robert Axelrod in *Genetic Algorithms and Simulated Annealing* (1987) illustrates the general nature of conventional genetic algorithms and how they apply to specific problems. In particular, it illustrates the process by which a mathematical problem is converted into a form involving strings of 0's and 1's (i.e. strings of binary "bits") of the same length. Thus the conventional genetic algorithm can be applied to the problem.

In his article on the Prisoner's Dilemma, Axelrod began by noting that there are 4 possible ways the previous play could have occurred (i.e. cooperation or non-cooperation by each of the 2 players). In order to represent this game within the confines of the conventional genetic algorithm, Axelrod decided to base a player's next move only on knowledge of the history of the previous 3 plays. Having made this limitation, there are then 64 possible previous play histories (i.e. 4 times 4 times 4). In this kind of representation scheme, the history of plays by both players for the previous 3 plays are associated with one of the 64 bit positions in a binary string of length 64. For example, bit position 64 might refer to cooperative plays by both players on all 3 previous plays (i.e. previous plays of CCCCCC). A "1" in bit position 64 of this string of length 64 might then instruct the player to cooperate on the current play if the previous plays have been CCCCCC. The entire string of 64 0's and 1's constitutes a complete way of telling the player how to move on the next play based on the history of the previous 3 plays. (In the article, Axelrod actually expands this binary string to length 70 to accommodate 6 special bit positions to deal with the very beginning of the game when there is no history).

After developing the representation scheme, the genetic algorithm begins by randomly creating a population of individual binary strings of length 70. The "fitness" of each of these individual strings (strategies) is then evaluated in an "environment" (which, in this case, consists of a series of different games). In order to play a particular game of the series in this "environment," it is necessary to refer to the appropriate bit position in the string of 70 0's and 1's for each move and then make the indicated move in the game; then, play the entire game; and, then, determine the payoff to the player for the game for following that particular individual strategy. These payoffs are then accumulated (and averaged) over the entire series of games to determine the average fitness of a particular individual strategy. Since each of the 70 bit positions in the binary string of length 70 represent a different past history, the series of games used to evaluate a given individual string would ideally contain a statistically meaningful number of different moves involving each of the 70 past histories.

The genetic algorithm then proceeds by identifying the best individual strategies in the current population and creates offspring for the next generation of individuals using the fittest individual strategies. As in nature, each offspring inherits some genetic traits from each parent in a process of "crossing" some genetic traits from each parent. The process of reproduction by the fittest and crossover tends to produce, over a period of many generations, a population with increasing overall fitness in the environment involved.

Axelrod achieved results from applying the conventional genetic algorithm to the Prisoner's Dilemma game that paralleled other mathematical research and international competitions on how to best play this game. However, it should be noted that the conventional genetic algorithm imposed four important limitations which restrict its usefulness in solving this particular gaming problem and other problems that have been studied.

First, the requirement that each individual in the population be a string of the same length required Axelrod to arbitrarily limit the player considering only a pre-determined number of previous plays (three here) in deciding how to make the next move. This meant possibly ignoring an opponent's previous history of deceitful "surprise attacks" if they occurred more than three moves in the past. Obviously, in many situations, a player whose strategy involves arbitrarily and intentionally ignoring available past history (particularly past history as recent as three moves earlier) would be susceptible to some devastating simple counter-strategies by the opposing player.

Secondly, the use of a binary string (a string of 0's and 1's) led to a representation scheme involving an explosively large number of "different" strategies merely to handle consideration of only the three previous plays ($2^{70}$ strategies—over a billion trillion). In contrast, if the representation scheme were not required to be rigidly structured in advance prior to the start of operation of the conventional genetic algorithm, a representation scheme involving only a relative handful of relevant possible histories might have evolved (e.g. "the opponent always cooperates", "the opponent cooperates about half of the time", etc).

Thirdly, the individuals in the population were representational descriptions (codings) of the strategy (as opposed to being actionable procedures which directly made the actual move in the game). Any particular strategy that one envisions and wants to include in the population had to be first coded into a binary string of length 70 before it could be inserted into the population. And, before any play could be made using a strategy, the binary string of length 70 had to be decoded into actionable instructions to make a move in a particular situation.

Fourthly, the binary strings of fixed length provide no hierarchical structure for potential solutions to the problem. The binary string is one dimensional. All items in the string operate at the same level. The significance and desirability of hierarchical structure for solving problems will be seen later.

Whatever the solution's structure, the natural selection process provides a powerful tool for problem solving. This is shown by nature and its various examples of biological entities that survive in various environments. In nature, complex combinations of traits give particular biological populations the ability to adapt, survive, and reproduce in their environments. Equally impressive is the complex, relatively rapid, and robust adaptation and relatively good interim performance that occurs amongst a population of individuals in nature in response to changes in the environment. Nature's methods for adapting biological populations to their environment and nature's method of adapting these populations to successive changes in their environments (including survival and reproduction of the fittest) provides a useful model. This model can develop methods to solve a wide variety of complex problems which are generally thought to require "intelligence" to solve.

In nature, a gene is the basic functional unit by which hereditary information is passed from parents to offspring. Genes appear at particular places (called gene "loci") along molecules of deoxyribose nucleic acid (DNA). DNA is a long thread-like biological molecule that has the ability to carry hereditary information and the ability to serve as a model for the production of replicas of itself. All known life forms on this planet (including bacteria, fungi, plants, animals, and human) are based on the DNA molecule.

The so-called "genetic code" involving the DNA molecule consists of long strings (sequences) of 4 possible gene values that can appear at the various gene loci along the DNA molecule. For DNA, the 4 possible gene values refer to 4 "bases" named adenine, guanine, cytosine, and thymine (usually abbreviated as A, G, C, and T, respectively). Thus, the "genetic code" in DNA consists of a long strings such as CTCGACGGT...

When living cells reproduce, the genetic code in DNA is read. Subsequences consisting of 3 DNA bases are used to specify one of 20 amino acids. Large biological protein molecules are, in turn, made up of anywhere between 50 and 500 such amino acids. Thus, this genetic code is used to specify and control the building of new living cells from amino acids.

A chromosome consists of numerous gene loci with a specific gene value (called an "allele") at each gene loci. The chromosome set for a human being consists of 23 chromosomes, and a typical human chromosome contains about 150,000,000 gene values. The 23 human chromosomes together provide the information necessary to describe one individual human being and contain about 3,000,000,000 genes. These 3,000,000,000 genes constitute the so-called "genome" for one particular human being. Complete genomes of the approximately 5,000,000,000 living human beings together constitute the entire pool of genetic information for the human species. It is known that certain gene values occurring at certain places in certain chromosomes control certain traits of the individual, including traits such as eye color, susceptibility to particular diseases, etc. Thus, our current world population of humans can be viewed as a product of a genetic algorithm.

*Adaptation in Artificial and Natural Systems*, by Professor John H. Holland, summarizes Holland's research in genetic algorithms and presents an overall mathematical theory of adaptation for both natural and artificial systems. A key part of this book described a "genetic algorithm" patterned after nature's methods for biological adaptation. However, a limitation of this work resides in using fixed length binary strings to represent the population. U.S. Pat. No. 4,697,242 (Holland) is an example of a process which uses fixed length binary strings with a genetic algorithm.

Empirical studies by various researchers have demonstrated the capabilities of such genetic algorithms in many diverse areas, including function optimization (De Jong 1980), operation of a gas pipeline (Goldberg 1983), pattern recognition (Englander in Grefenstette, 1985), and many others.

In the chapter entitled "An Overview" contained in the 1987 collection *Genetic Algorithms and Simulated Annealing*, Lawrence Davis and Martha Steenstrup stated, "In all of Holland's work, and in the work of many of his students, chromosomes are bit strings—lists of 0's and 1's." In addition, they continue, "Some researchers have explored the use of other representations, often in connection with industrial algorithms. Examples of other representations include ordered lists (for bin-packing), embedded lists (for factory scheduling problems), variable-element lists (for semiconductor layout), and the representations used by Glover and Grefenstette in this volume."

Some researchers have attempted to solve search and optimization problems using schemes patterned after evolution that employed mutation-plus-save-the-best strategies. Examples are Box (1957), Hicklin (1986), and the 1966 book by Fogel, Owens, and Walsh entitled *Artificial Intelligence Through Simulated Evolution*. The few results obtained from these efforts were highly specific to particular applications and domains and largely reflect the cleverness of implementation of the mutation concept rather than its usefulness as a general technique for achieving adaptive increases in fitness in populations. It is important to note that mutation is not the primary means by which biological populations in nature improve their fitness and it is not the primary means used in the present invention.

Since Holland's 1975 book, Holland and various colleagues have developed a novel application of conventional genetic algorithms called a "classifier system". A classifier system is a group of rules. Each rule consists of a conditional part and an action part (i.e. an IF-THEN rule). Both the conditional part and action part of each rule are like the individuals in the conventional genetic algorithm in that they are a strings of 0's and 1's of fixed length. In a classifier system, messages (consisting of binary strings) are received from the environment and activate those rules whose conditional part ("IF" part) match the message (binary string) coming in. This activation triggers the action part ("THEN" part) of the rule. The action part of a rule sends out a new message (binary string).

Classifier Systems are described in the 1978 article "Cognitive Systems based on Adaptive Algorithms" (by Holland and Judith S. Reitman) published in *Pattern-Directed Inference Systems*, edited by D. A. Waterman and Frederick Hayes-Roth; and David E. Goldberg's 1983 dissertation entitled *Computer-Aided Gas Pipeline Operations Using Genetic Algorithms and Rule Learning*. In classifier systems, credit is assigned to chains of individual rules that are invoked by a credit allocation scheme known as the "bucket brigade". The Holland process is a combination of a classifier system and a "bucket brigade algorithm". A 1987 paper by Cory Fujiki and John Dickinson in *Genetic Algorithms and Their Applications: Proceedings of the Second International Conference on Genetic Algorithms*, (edited by John J. Grefenstette) describes a computer program for a classifier system written in LISP for solving the Prisoner's Dilemma using binary strings of fixed length and IF-THEN classifier rules.

We call conventional genetic algorithms "linear" because they manipulate strings (sequences) of characters over a fixed alphabet (typically strings of binary digits 0 and 1). This is in contrast to the "non-linear" situation in which the objects being manipulated are hierarchical expressions consisting of a hierarchical arrangement of functions and arguments.

The reasons for limiting the conventional genetic algorithm to binary strings of fixed length appear in the literature. First, in his 1983 disseration entitled *Computer-Aided Gas Pipeline Operation Using Genetic Algorithms and Rule Learning*, David E. Goldberg argues that any binary string of the common fixed length always has an interpretation (via a well-defined representation scheme) to the problem being solved. This might be called the property of being "well defined" and it is a desirable property.

Secondly, if each individual in the population consists of a binary string of fixed length, then the crossover operation will always produce another binary string of fixed length when applied to any two individuals in the population. This might be called a "closure" property and it is also a desirable property. Of course, binary strings of fixed length are not the only way of achieving these desirable properties of closure and being well-defined.

In *Adaptation in Natural and Artificial Systems* (1975, page 71), Holland argues in favor of strings consisting only of 0's and 1's (i.e. binary strings) in the conventional genetic algorithm on the basis that the number of strings in the search space that are searched automatically using what he calls the "implicit parallelism" of the conventional genetic algorithm is highest when the strings consist only of two possibilities. This point is true; however, it should not be the controlling consideration. For various reasons cited hereinafter, limiting the genetic algorithm to the one dimensional world of linear strings of fixed length (and, in particular, binary strings of fixed length) precludes solving many problems.

The field of computer science is replete with other situations where it is highly unrealistic to assume that the size or shape of a problem is known in advance to the solver so that he can use this information to rigidly pre-specify the size and shape of his search in advance. An elementary example from information theory illustrates this point. Huffman codes are binary strings of variable length that are used to maximize the amount of information that can be transmitted over a given channel. Huffman codes are somewhat similar to Morse code in that more frequent messages (letters, such as "e") are assigned codes of shorter length and less frequent messages are assigned codes of longer length. The Huffman coding algorithm starts with the messages that are to be transmitted and their probability of occurrence. The algorithm then assigns relatively short binary strings to the most frequent messages and relatively long binary strings to the rarer messages. The size of the strings needed in a Huffman coding scheme is not known in advance, but it is determined after applying the algorithm to the particular set of messages and their respective probabilities. Any attempt to decipher a Huffman code by searching and matching strings must take the length of longest binary strings actually used by the coding algorithm into account.

Using fixed length binary strings in conventional genetic algorithms limits their ability to solve many problems. The following 3 separate example problems illustrate additional limitations of conventional genetic algorithms.

First, suppose we want a computer to program itself to solve the problem of finding the point at which two intersecting straight lines intersect. The point of intersection of two straight lines is the pair of numbers that satisfy the two linear equations in two variables that represent the lines. Thus, the computer program we are seeking would use the coefficients of the two equations and various mathematical operators (such as multiplication, substraction, etc.) to produce the desired answer. To make the problem of having a computer learning to program itself more realistic, it is best not to specify in advance the size or shape of the mathematical expression needed to solve the problem. It is also more realistic if the computer had access to various irrelevant inputs and extraneous mathematical operations to confuse its search to find the solution to the problem.

There is no simple or convenient way to uniquely associate a binary string whose length is predetermined in advance with an arbitary mathematical expression composed of specified mathematical operations (functions) and arguments. A binary string of length n can only represent $2^n$ different things (no matter what the representation scheme). No matter how large an n is preselected in advance, there are additional mathematical expressions.

Before continuing, it should be emphasized that it is not necessary to represent things of infinite size. Rather, what should be avoided is arbitrarily pre-setting a limit on the size and shape of the things being represented (even though any particular thing will itself be finite in size). In most problems, the size and shape of the solution are not necessarily known in advance. The process of solving the problem should be free to develop proposed solutions without any pre-set limit on the size and shape of the solution.

Even if an arbitrary maximum length specified in advance were acceptable, the method for associating each arbitrary mathematical expression (for example: A*B+C−D*E*F) with a binary string would necessarily obscure the underlying mathematical operations involved. The highly complex method used by Godel in 1931 in his proof of the Incompleteness Theorem is an example of such a method for making this kind of association. Thus, this first example problem highlights the need to be able to represent arbitrary mathematical expressions (involving various functions and arguments) whose length is not arbitrarily limited in advance (rather than merely strings of 0's and 1's of the same fixed length).

It should be noted that if it is assumed that the two straight lines in this problem always intersect, the problem is entirely numerical. However, if the two lines might possibly be parallel, the answer from a computer program to this expanded version of the problem might appropriately be a symbolic response (e.g. "The Equations are inconsistent and the lines are parallel") rather than the numeric location of the point of intersection. This situation can be easily recognized by a computer program by checking to see if a certain computed value (the determinant) is zero. Thus, this expanded version of this first example problem highlights the need occasionally to accommodate symbolic processing and symbolic output from a computer program that normally produces a numeric output.

Second, consider the problem of predicting the future elements of a sequence of numbers from a sampling of early numbers from the sequence. This problem is an example of induction. Induction is the logical process by which one observes specific examples of some process (e.g. "The sun has come up every morning so far during my life") and then "induces" a reasonable underlying rule for the process (e.g. "The sun always comes up in the morning"). In applying inductive reasoning, there is no proof that the result is correct. Nonetheless, the process of induction is very important and indeed lies at the heart of all learning.

In contrast, deduction is the logical process in which one starts with some given premises (or facts) and some deductive rules of inference and then reaches a logical conclusion by repeatedly applying the deductive rules to the original given premises or facts. The sequence of steps used in deduction to reach a conclusion is called the proof.

If one is given a sampling of a sequence of numbers such as 0, 2, 4, 6, 8, 10, 12, 14 it is not difficult to reasonably induce that the next number in the sequence is 16. The number 16 is a reasonable induction because each previous element of the sequence is 2 times the element's position in the sequence (counting the first element as position 0). Note, however, that even elements of this simple numerical sequence cannot be represented with strings whose length has been specified in advance.

More interesting sequences involve more complicated mathematical operations. For example, the 6th element of the sequence 2, 4, 8, 16, 32, can be expressed directly in mathematics as 2 raised to the 6th power (i.e. 64). This sequence can also be expressed in mathematics using a recursion—that is, by defining the 6th element in terms of previous element(s) in the sequence. In this case, the $m^{th}$ element of the sequence is 2 times element $m-1$ of the sequence (that is, 2 times 32 is 64).

For some important mathematical sequences, there is no known non-recursive expression for each element of the sequence, and the use of a recursion becomes a necessity, not merely an option. The well-known Fibonacci sequence 1, 1, 2, 3, 5, 8, 13, 21, 34, 55, is constructed by adding the 2 previous elements of sequence. For example, 8 is the sum of 3 and 5, and 13 is the sum of 5 and 8. In general, the $m^{th}$ element of the Fibonacci sequence is the sum of element $m-1$ and element $m-2$ of the sequence (with the understanding that the first two elements of the sequence are a "default" value of 1).

Thus, the problem of sequence induction highlights the need to be able to represent recursions as well as arbitrary mathematical expressions (involving functions and arguments). It also re-emphasizes the need to able to represent strings whose length has not been pre-specified in advance.

Third, consider the vexatious mathematical problem known as the Traveling Salesperson Problem. In this problem, the salesperson is given a mileage chart with the distances between a specified number of cities and is required to visit each of the cities once (and return home) while covering the least miles.

There is no known general mathematical formula giving the answer to this seemingly simple problem. There is no known general computational procedure (i.e. computer program, algorithm) to solve this problem (other than via "brute force": exhaustive evaluation of each of the alternative possible tours). The number of alternative possible tours is equal to the factorial of the number of cities. It is prohibitive for even the fastest computers to attempt to solve this problem in this way for even a relatively small number of cities. For example, for only 14 cities, there are 87,178,291,200 possible tours.

However, because of the practical significance of this kind of complex optimization problem (which has many equivalent industrial versions involving minimizing costs, times, and other resources), there is a vast literature describing past efforts to solve this problem, including various computational procedures that produce what appear to be reasonably good practical results within a reasonable amount of computer time. The 1985 book, *The Traveling Salesman Problem* by Eugene L. Lawler, J. K. Lenstra, A. H. G. Rinnooy Kan, and D. B. Shmoys, is a recent summary of progress in research on this problem.

Intuitively, an especially natural way to attack the Traveling Salesperson Problem would seem to be to decompose the set of cities into smaller, more manageable sub-tours of cities; then, to find the best way of visiting all the cities in the sub-tour; and, finally, to find the best way of assembling the sub-tours into one grand tour. For example, if state capitals are being visited, it seems clear that one should consider the 6 state capitals in New England as a sub-tour beginning in Hartford, Connecticut and ending in Montpelier, Vermont and to then analyze how to best visit the 4 other cities within the sub-tour. On the other hand, it is far from clear in advance as to what size sub-tour or which cities belong in the best sub-tour involving the state capitals in the Midwest. Indeed, any attempt to arbitrarily pre-specify either sub-tour size or sub-tour contents in advance would seem likely to preclude finding the overall best solution.

Thus, the Traveling Salesperson Problem highlights the need to represent an arbitrary set of items with no duplicates (i.e. permutations) and various arbitrary subsets of such items of arbitrarily varying size. It also highlights the need to be able to develop hierarchies in which solutions to sub-problems are manipulated and assembled hierarchically into solutions to the original main problem.

In fact, many mathematical problems are solved by first "decomposing" a larger problem into smaller sub-problems. Then, an attempt is made to solve each of the sub-problems. And, finally, the solutions to the sub-problems are assembled into a solution to the original problem. The problem of solving sets of a large number of equations with many variables and solving polynomial equations of high order are examples of problems where decomposition can be used.

In some cases, there is a symmetry between this process of assembly and the solution to the individual sub-problem. That is, in this assembly process, the solutions to the sub-problems may be manipulated as if they themselves were merely the elements of a sub-problem. In the case of the Traveling Salesperson Problem, for example, the process of combining the sub-tours into one grand tour might involve treating each of the sub-tours as if it were merely a single city (i.e. the basic element of a sub-tour) and then trying to find the best way to visit those "cities". This kind of symmetry often develops when problems are solved by decomposition.

Even when no symmetry is involved, a "hierarchy" develops when a problem is solved by decomposition. At the lowest level of the hierarchy, the sub-problem is solved. The hierarchy consists of combining the solutions of the sub-problem into the solution to the larger problem. Something similar is commonplace in computer programming in general. For example, sub-routines (or sub-procedures) are typically called by a main program. The main program is at the top of the hierarchy, typically organized to provide an overview of the solution to the whole problem. Each of the sub-routines called by the main program are found at one level lower on the hierarchy. If one of the sub-routines itself happens to call upon another sub-routine, that second sub-routine is one level lower on the hierarchy than the sub-routine which called it. Complex social organizations (such as corporations and military organizations), are similarly organized into hierarchies.

The ability to decompose problems into hierarchies of sub-problems is generally important for solving problems. A significant fraction of the papers found in the 1985 and 1987 *Proceedings of the International Conference on Genetic Algorithms and their Applications*, and other articles in the literature, discuss the difficulties of applying the conventional genetic algorithm to the Traveling Salesperson Problem and other problems involving permutations.

What is needed is a way to apply some of the general principles of biological natural selection that are embodied in the conventional genetic algorithm (i.e. survival of the fittest and crossing over of parents' traits to offspring) to a greatly expanded class of problems. In particular, what is needed is a method for adaptively creating computer programs involving complicated combinations of mathematical functions and their arguments, recursions, symbolic processing, and other complicated data structures (such as permutations) with no advance limitations on the size, shape, or complexity of the programs. One object of the present invention is to provide a genetic algorithm to provide solutions for an expanded class of problems. A further object of the present invention is to provide a genetic algorithm process without any predetermined limits on the size, shape, or complexity of the members of the subject population.

REFERENCES CITED

U.S. Patent Documents 4,697,242, "Adaptive Computing System Capable of Learning and Discovery", September 29, 1987, Holland et. al.

Other Publications

Box, G. E. P. "Evolutionary Operation: A Method for Increasing Industrial Productivity"—*Journal of the Royal Statistical Society*, 6(2), 81-101

Davis, Lawrence (Editor)—*Genetic Algorithms and Simulated Annealing*, Pitman, London 1987

Fogel, L. J., Owens, A. J. and Walsh, M. J.—*Artificial Intelligence through Simulated Evolution*, New York: John Wiley 1966

Fujiki, Cory—*An Evaluation of Holland's Genetic Operators Applied to a Program Generator*, Master of Science Thesis Department of Computer Science, University of Idaho, 1986

Goldberg, David E.—*Computer-Aided Gas Pipeline Operation Using Genetic Algorithms and Rule Learning*, (Doctoral Dissertation, University of Michigan, 1983) Dissertation Abstracts International 44(10), 3174B (University Microfilms No. 8402282)

Grefenstette, John J. (Editor)—*Proceedings of an International Conference on Genetic Algorithms and Their Applications*, Pittsburgh 1985

Grefenstette, John J. (Editor)—*Genetic Algorithms and Their Applications: Proceedings of the Second International Conference on Genetic Algorithms*, Lawrence Erlbaum Associates, Hillsdale, New Jersey 1987

Hicklin, Joseph F.—*Application of the Genetic Algorithm to Automatic Program Generation*, Master of Science Thesis Department of Computer Science, University of Idaho, 1986

Holland, John H.—*Adaptation in Natural and Artificial Systems*, The University of Michigan Press, Ann Arbor, 1975

Holland, J. H., and Reitman, J. S. (1978). Cognitive systems based on adaptive algorithms. In D. A. Waterman and F. Hayes-Roth (Eds.), *Pattern Directed Inference Systems* (pp. 313-329), New York: Academic Press Lawler, E. L., Lenstra, J. K., Rinnooy Kan, A. H. G., and Shmoys, D. B. *The Traveling Salesman Problem*, John Wiley & Sons, New York, 1986

SUMMARY OF THE INVENTION

The present invention relates to non-linear genetic algorithms. The process of the present invention operates upon a population of entities which accomplish tasks and can vary in size and shape. Each iteration of the process comprises activating, assigning, selecting, choosing, performing, and adding. First, each entity activates to accomplish its goal and produces a result. Second, a value is associated with the result of each activation and assigned to the corresponding entity. Third, at least one entity having a relatively high associated value is selected. Next, an operation is chosen from crossover, permutation, or reproduction. If crossover is chosen, then the selected entity performs the crossover operation. Crossover creates new entities by combining portions of at least one selected entity with portions of at least one other entity. To perform permutation, the selected entity is reordered without a net gain or loss. Reproduction retains the selected entity in the population. Finally, the newly produced entities are added to the population.

DETAILED DESCRIPTION OF THE INVENTION

Figure 1:
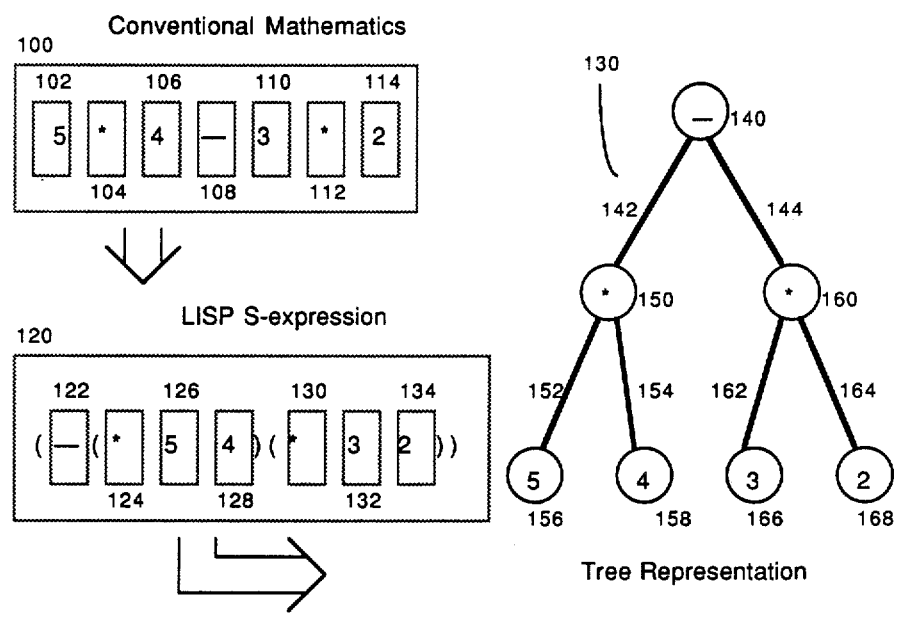
FIG. 1 is a tree diagram representation of a LISP S-expression.

The present invention describes a genetic algorithm process for problem solving. In the following description, numerous specific details are set forth in order to prove a thorough understanding of the present invention. It will be obvious, however, to one skilled in the art that the present invention may be practiced without using these specific details. In other instances, well-known methods and structures have not been described in detail so as not to unnecessarily obscure the present invention.

The present invention operates on a population of entities. The entities must possess an ability to produce an objectively observable result. To provide utility, the entities must direct their actions toward a constructive end, even if their results do not always serve those ends. The iterative process of the present invention produces populations which tend to accomplish their constructive ends better than previous populations.

Although the preferred embodiment uses computer programs as entities, using other types of entities remain within the scope and spirit of the present invention. For example, combinations of electrical circuits could provide a population for the iterative process of the present invention. The circuits could reproduce and crossover until the population produces sufficiently robust solutions to a subject problem. Additionally, different automobile designs could comprise another population, with elements of the designs taken as different alleles for crossover and rearrangement. Thus although the following description uses computer programs as entities, the description does not limit the present invention.

The computer languages FORTRAN, COBOL, ALGOL, PL/1, PASCAL, C, PROLOG, ADA, BASIC, etc. have the ability to write complicated mathematical expressions, recursions, complex data structures, and symbolic expressions. Some of these languages can write symbolic expressions that are executable as computational procedures (or programs) within the language itself. Also, some of these languages can generate symbolic expressions, although often this process is inconvenient and inefficient. In general, most computer languages do not allow arbitrarily complex expressions to be written. Also, most do not delay assigning actual computer memory (and types) in the computer for such expressions until just prior to actual execution of the expression. Such a memory management method is termed dynamic storage allocation or "late binding".

One existing computer language, however, has all the features discussed above and is generally available in relatively efficient forms on a variety of computers. This language is LISP, and is the computer language of choice for many artificial intelligence applications. Many dialects of the LISP language have been created over the years. A dialect of LISP called "Common LISP" has started to emerge as a standard.

The LISP programming language's basic structure is a list of items (an ordered set of items contained within a pair of parentheses). An important source of LISP's simplicity, generality, and power arises from treating the first element in every list encountered as a function to be executed, termed "evaluated", and treating the remaining elements of the list as arguments to that function. Moreover, unless otherwise indicated, LISP reads, evaluates, and returns a value for each such function it encounters. Thus, in LISP, entire computer programs can appear as merely functions within functions within functions (often called "compositions" of functions). Applying functions to arguments as encountered controls the flow of LISP program. In other words, the control structure in LISP is based on composition of functions.

Within the outermost pair of parentheses in LISP, there may be numerous functions, including functions for performing arithmetic, functions for performing recursions, functions for modifying symbolic expressions, functions for conditionally varying the program flow, and other complex functions. A key feature of LISP is that LISP programs have the same form as the data (and the functions). As the above features indicate, LISP is a functional programming language. LISP is not the only existing functional programming language nor is it the only possible functional programming language. It is, however, the most widely used language in this category and well-suited for the requirements at hand.

In spite of the complex results obtained, LISP can be viewed as being very simple because it simply reads, evaluates, and returns a value for each such function it encounters. This seeming simplicity gives LISP enormous flexibility (including the flexibility to accommodate computational procedures which modify themselves and execute themselves). This enormous flexibility makes LISP the preferred computer language for the present invention.

For example, consider the simple mathematical expression ordinarily written as 5 * 4 − 3 * 2. To evaluate this expression, one must start by first evaluating 5 * 4. One evaluates 5 * 4 by performing the function of multiplication (*) on the two arguments (5 and 4). The basic structure in LISP is a list of items (that is, an ordered set of items contained within a set of parentheses). Moreover, unless otherwise indicated, LISP treats the first item in every list encountered as a function and the remaining items in the list as arguments to that function. Thus, LISP represents 5 * 4 as (* 5 4). Here a function (i.e. the multiplication function denoted by *) is the first item of the list and the two arguments to the function (i.e. the two numbers to be multiplied) follow. Similarly, LISP denotes 3 * 2 as (* 3 2). Once these two multiplications are executed (evaluated), the substraction function then has the two arguments (i.e. 20 and 6). The two values obtained by evaluating these two multiplication functions are treated as arguments to the substraction function which performs the operation of substraction, which is (−(* 5 4) (* 3 2)). Expressions such as (−(* 5 4) (* 3 2)) in LISP are called S-expressions. Here the function of subtraction (−) is performed on the result previously obtained for (* 5 4) and (* 3 2). When a simple number or variable is used as the argument of a function (such as the 3 or 2 in the multiplication 3 * 2), it is called an "atomic" argument. The contrasting situation occurs with a composition of functions when the argument to one function is itself the result of carrying out an earlier (embedded) function. We can represent increasingly complex mathematical expressions by embedding previous results within new expressions in this manner.

It is helpful to graphically depict a functional programming language's expressions. Functional expressions can be viewed graphically as a tree with labels on the various points of the tree. In particular, any such expression can be viewed as a rooted point-labeled tree in which the internal points of the tree are labeled with functions and the endpoints of the lines radiating downwards from each such internal point is labeled with the arguments to that function. By use of the term downwards with rooted-point labeled trees, extending farther away from the root of the tree is the intended meaning. The external points of the tree (sometimes called "leafs") are labeled with the atomic arguments. The root of the tree is the particular internal point labeled with the function executed first. In a LISP S-expression, the first function is the outer-most LISP function (i.e. the function just inside the outermost left parenthesis of the LISP S-expression).

FIG. 1 illustrates this for LISP using the equation 5 * 4 − 3 * 2. In the ordinary notation of arithmetic shown as equation 100, the function 104 (multiplication) operates on the arguments 102 and 106 (i.e. 5 and 4 respectively) and the function 112 (multiplication) operates on the arguments 110 and 114 (i.e. 3 and 2 respectively). The function 108 (subtraction) then operates on the results of these two functions as its arguments. The function 108 is higher in the hierarchy than the functions 104 and 112.

In FIG. 1, the LISP S-expression 120, (−(* 5 4) (* 3 2)) is expressed as the function 124 (multiplication) operating on the arguments 126 (the number 5) and 128 (the number 4) and the function 130 (multiplication) operating on the arguments 132 (the number 3) and 134 (the number 2). The function 122 (subtraction) then operates on the results of these two evaluations.

When presented graphically in FIG. 1, the internal point 150 of the tree 130 with root 140 is labeled with the function of multiplication (*) and the external points 156 and 158 of the tree are labeled with the two arguments to the multiplication function (i.e. 5 and 4 respectively). The arguments to a given function (such as the multiplication function denoted by the internal point 150) are found by following the lines 152 and 154 radiating downwards from the internal point 150. Similarly, the internal point 160 of the tree is labeled with the function of multiplication and the external points of the tree 166 and 168 are labeled with the two arguments to the multiplication function (i.e., 3 and 2, respectively). The arguments to the function 160 are found by following the lines 162 and 164 radiating downwards from the internal point 160. The internal point of the tree 140 is labelled with the subtraction function. The arguments to the subtraction function are found by following the lines 142 and 144 radiating downwards from point 140. These arguments turn out to be the results of the previously performed multiplication operations. Arguments may be found at external points (if they are "atoms") or at internal points (i.e. when the arguments to one function, such as subtraction here at 140, are the result of previous functions). The internal point 140 is the root of the tree and is labeled with the outermost function (subtraction) 122 in the LISP S-expression 120 (i.e., the function just inside the outermost left parenthesis of the LISP S-expression).

The advantage of a computer language such as Common LISP for performing work of this kind derives from the enormous flexibility arising from repeated applications of this very simple basic structure. The functions available in LISP can include functions other than the simple arithmetic operations of multiplication and subtraction. They include more complex mathematical functions such as square roots, exponentiation, etc; program control functions such as PROGN which allow a series of LISP expressions to be performed in series; recursions (wherein a function refers to itself in the process of evaluating itself); iterative functions (such as DOTIMES) which cause certain functions to be performed repeatedly (typically with differing arguments); conditional functions [which cause specified alternative functions to be performed if some predicate function is (or is not) satisfied]; and symbolic functions which operate on symbols (instead of numbers).

Figure 2:
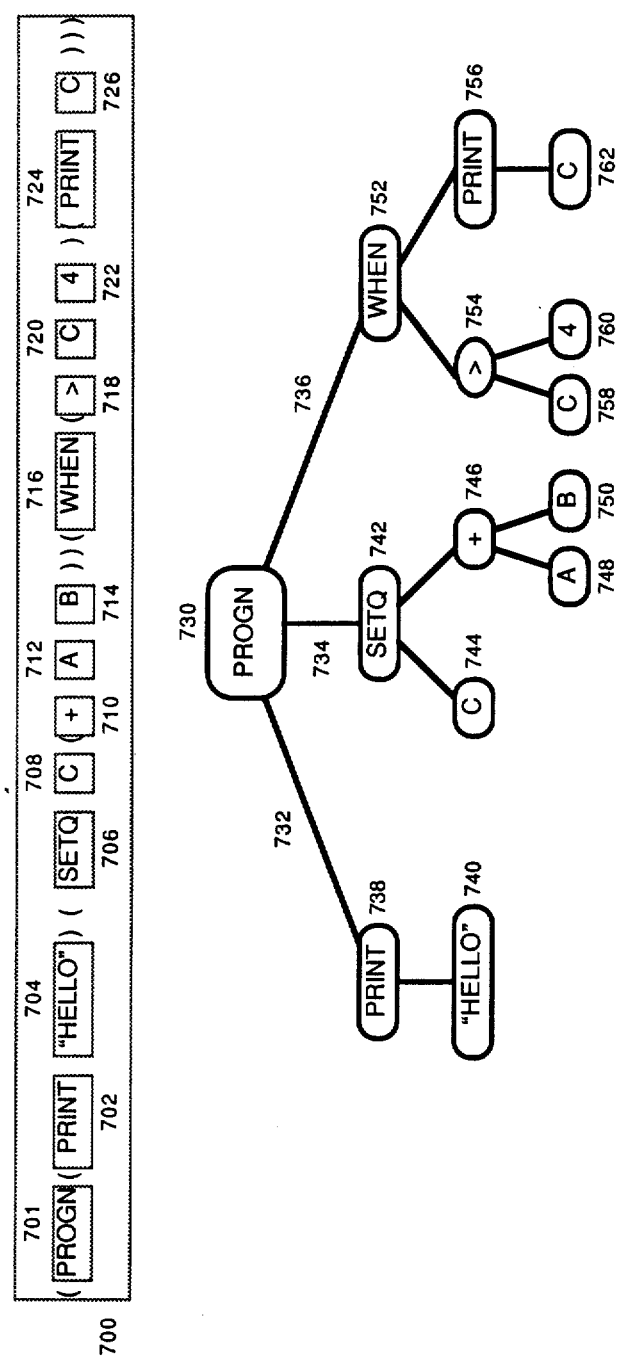
FIG. 2 is a tree diagram representation of a LISP program.

By way of an example, suppose we want a computer program to begin by printing the symbolic string "HELLO"; then set the variable C to the sum of the variables A and B; and, then print the value of C only when C is greater than 4. In FIG. 2, the LISP S-expression (i.e. program) 700 performs these tasks. The function 701 PROGN allows a series of 3 major steps to be combined together into one program. The first major step of the series involves the function 702 (PRINT) operating on the symbolic string argument 704 ("HELLO"). The second major step involves the function 706 (SETQ) operating on a variable 708 (C) and the result obtained from the function 710 (addition) operating on the arguments 712 (the variable A) and 714 (the variable B). The SETQ function assigns a value (its second argument) to a variable (its first argument). Finally, the third major step involves the conditional function 716 (WHEN) operating on two arguments. The first argument is a predicate function involving the relationship 718 (greater than) operating on the arguments 720 (the variable C) and 722 (the number 4). The second argument is the function 724 (PRINT) operating on the argument 726 (the variable C).

Graphically, this LISP program (S-expression) can be represented as a tree whose internal points are labeled with functions and where the endpoints of the lines radiating downwards from each such internal point is labeled with the arguments to that function. In this graphical representation, one of the internal points is the root of the tree and the root is labeled with the function that appears just inside the first left parenthesis of the LISP S-expression.

Here, the root of the tree 730 is labeled with the function PROGN. The function PROGN has 3 arguments. The 3 lines 732, 734, and 736 radiating downwards from the internal point 730 (the root) correspond to the 3 arguments of PROGN. The first argument of PROGN is function 738, the PRINT function. It is the endpoint of the first line 732 radiating downwards from internal point 730. The function PRINT has one argument 740. In the case of the PRINT function, it has one argument which it prints. In this case, the argument is the symbolic string 740 "HELLO". This string 740 "HELLO" is an atomic argument and appears at an external point (leaf) of the tree.

The second argument of PROGN is function 742, the SETQ function. The function SETQ has two arguments 744 and 746. The second argument of SETQ is itself a function 746 (addition) operating on the two arguments 748 (the variable A) and 750 (the variable B). The two arguments 748 and 750 are the variables A and B (atoms in LISP). They appear at external points (leafs) of the tree. The first argument of SETQ is 744 (the variable C) which is set to the sum of A and B.

The third argument of PROGN is function 752, the WHEN function. The function WHEN has two arguments, 754 and 756. The first argument of the WHEN function is a predicate function 754 (greater than). The predicate function 754> has two arguments 758 (the variable C) and 760 (the number 4). The predicate function 754> returns a value of T (for "True") or NIL (for "False") depending on whether its first argument 758 (the variable C) is greater than its second argument 760 (the number 4). The WHEN function executes its second argument 756 (the PRINT function) if its first argument 754 evaluates as T (True). The PRINT function 756 has one argument 762 (the numeric value of the variable C). Note that the PRINT function is flexible; it can accommodate a symbolic argument (such as "HELLO" at 740) or a number (such as the variable C at 762).

Although LISP can be run on virtually any computer, it is preferable to use a computer especially designed for performing LISP functions. The Texas Instruments Explorer II computer is particularly advantageous for these purposes because it contains an especially designed microprocessor chip (called the Mega Chip) which performs LISP functions directly. The Mega Chip contains basic microcode that correspond directly to the basic operations of LISP. These include, among others, basic LISP operations for constructing stacks (which, among other things, retain references to repeated calls on functions) and performing other operations peculiar to LISP. A conventional microprocessor chip (such as the Intel 80286 contained in the IBM AT computer) can be programmed to carry out the various LISP functions by applying its generic computer instructions to the requirements of LISP.

Moreover, it is especially advantageous to run LISP programs on computers with large amounts of internal memory because the complex structures that one develops using LISP in applications such as are described here often require large amounts of memory. To the extent that computer memory is not available as internal memory in a given computer, significant inefficiencies in operation result. Since the solution to problems often require complex structures, significant inefficiencies may make the difference between being able to solve the problem or not solve the problem. The preferred embodiment of the present invention uses an Explorer II computer with 32,000,000 bytes of internal memory (32 megabytes).

After generating a population of computational procedures, these procedures are executed and a value in the environment involved is assigned to the result of the execution. Thus an important requirement for any implementation of this system is the ability to generate computational procedures (computer programs) and then execute them to produce a result.

Using LISP representations on a computer having sufficient memory, the present invention can solve problems previously intractable under prior art methods. This disclosure presents a general method and specific examples of the present invention. First, the process itself is described. Secondly, three examples of its operation are presented. The three examples illustrate the operation of the present invention dealing with linear equations, sequences, and the traveling salesperson problem.

Figure 3:
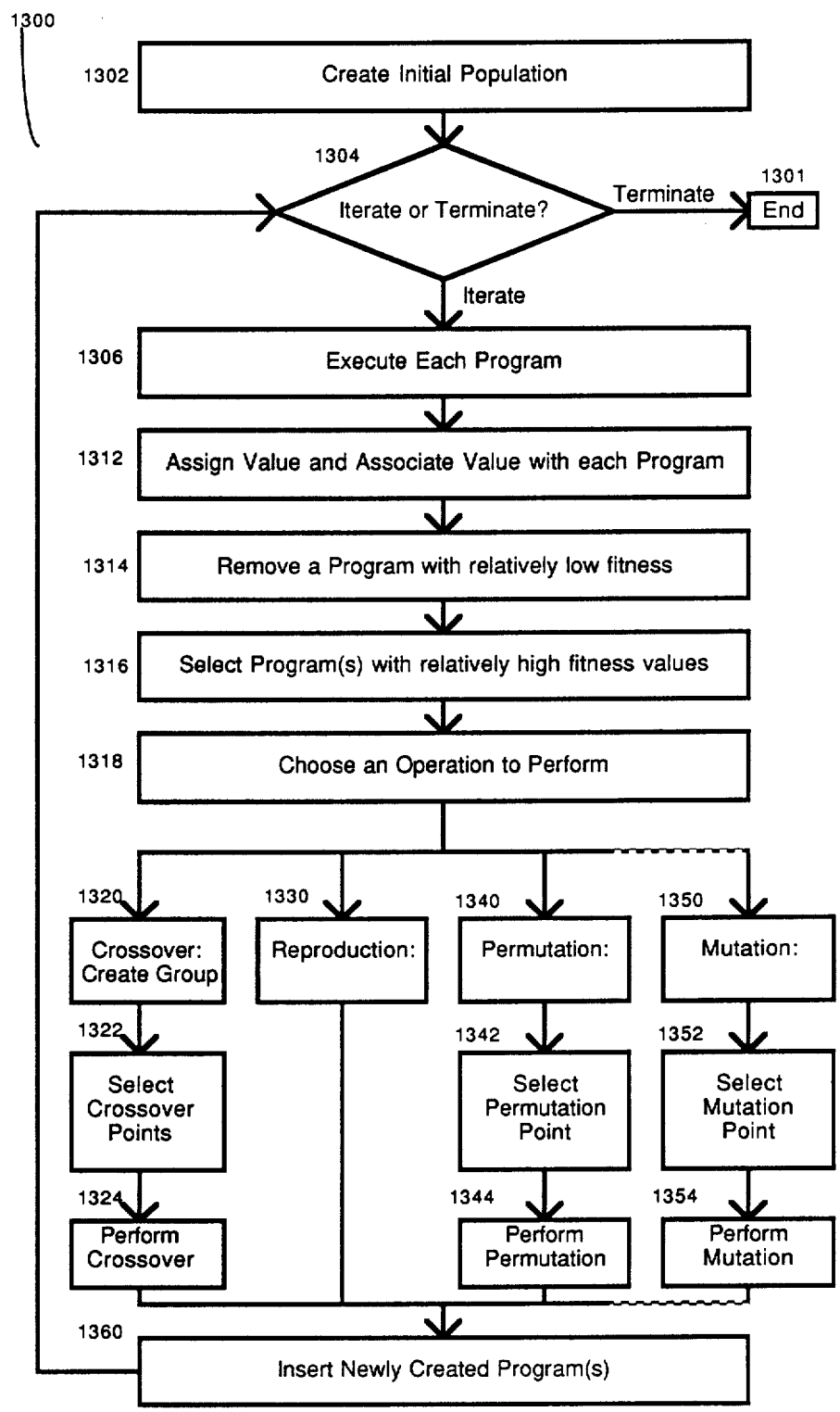
FIG. 3 is a flow chart diagram of the present invention.

FIG. 3 is a flow-chart of the process of the present invention. The process 1300 starts by the step Create Initial Population 1302 which creates a number of programs (typically randomly). If the termination test for the process 1304 is satisfied (for example, by achieving a known best solution to the problem among the population of individuals, by achieving a certain degree of improvement in average fitness for the population, etc.), the process terminates at End 1301. Otherwise, the process continues to iterate.

The basic iterative loop of the process begins with the step Execute Each Program 1306 wherein each program executes. The next step, Assign Value and Associate Value with each Program 1312, involves assigning a value (fitness) to each result produced by execution, and associating the value with the producing program. After assigning and associating, Remove Program(s) with relatively low fitness, step 1314, causes the removal of the less fit members of the population (the term "program(s)" used herein refers to the phrase "program or programs"). Although not essential, step 1314 improves the average fitness and eases memory requirements by keeping the population within reasonable limits. Step 1316, Select Program with relatively high fitness values, picks at least one program to use in the following operation. The selected program(s) have a relatively high fitness value.

At step 1318, Choose an Operation to Perform, the process determines which operation to begin. Crossover 1320 and Reproduction 1330 are the basic operations performed; however, Permutation 1340 also plays a role. Optionally, the operation of Mutation 1350 may be used. Typically, the vast majority of operations are the reproduction and crossover operations. For example, in a population of 1,000 individuals, the particular method might specify that a new population of size 1,000 be created by selecting 350 groups of two parents from among the high fitness individuals of the population for crossover, making 250 selections of high fitness individuals for simple reproduction, and making 50 selections of high fitness individuals for the permutation operation. The 350 groups of two parents will produce a total of 700 new offspring using crossover. These 700 offspring, in conjunction with the 250 individuals retained as a result of simple reproduction and the 50 offspring produced as a result of the permutation operation will maintain the total population size at 1,000. The parameters might also specify, in addition, that mutation of a single allele occur with a probability of $p=0.0001$. Thus, if the average individual has Q points at which mutation might occur, a total of $Q*N*p$ alleles will be mutated (in a population of size N). If Q is 10, then 1 allele out of 10,000 alleles in a population of 1,000 individuals will be altered as a result of the mutation operation.

If, in selecting the 350 groups of two parents above, the selection is carried out with probabilities strictly proportionate to fitness, the same individual may be selected more than once (i.e., selection with replacement allowed). If desired, however, one can deviate from this theoretically preferred approach and create a mating pool of individuals with relatively high fitness and then select 350 groups (without replacement) of two parents. It should be recognized that there are numerous slight variations of the overall process possible. Some of these variations can be used as a matter of convenience.

Crossover 1320 requires a group of at least two programs (typically two parents), so second program(s) are picked to mate with at least one selected program(s). No definitive method of choosing the second parent or parents exists, but choosing only relatively high fitness individuals is preferable over choosing randomly. Parents mate by matching selected program(s) with at least one second picked program(s). For each mating, a crossover point is separately selected at random from among both internal and external points within each parent at Select Crossover Points 1322. Then newly created programs are produced at Perform Crossover 1324 from the mating group using crossover. Two parents would typically produce two offspring.

Note also no requirement exists that the population be maintained at a constant size. The version of the crossover operation producing two offspring from two parents has the convenient attribute of maintaining the population at constant size. (Note that the other operations each produce one offspring from one parent so that they too maintain constant population size). On the other hand, if the crossover operation acts on a group of more than two parents, the size of the population may grow. For example, if three parents formed a mating group, each parent would have two crossover points selected for it and there would be 27 possible offspring ($3 \times 3 \times 3$). Even if the three offspring equivalent to the three original parents are excluded, there would be 24 possible new offspring available. In general, if there are N parents, then $N-1$ crossover points would be selected for each and there would be $N^N - N$ new offspring available. When an operation produces more offspring than parents, then either the population can be allowed to grow or the population can be trimmed back to a desired (presumably constant) size when the next round of fitness proportionate reproduction takes place.

For the operation of Reproduction 1330, the Selected program(s) remain unchanged. The preferred method for selecting computational procedures for reproduction is to select them with a probability proportional to their normalized fitness.

If the permutation operation is selected then the process continues at Permutation 1340. A permutation point is selected at random in Select Permutation Point 1342 from among the internal points within the selected individual. Then Perform Permutation 1344 is performed, by reordering the selected program's subprocedures, parameters, or both at the permutation points.

If the mutation option is chosen, Mutation 1350 occurs. The location of the mutation is picked in Select Mutation Point 1352 for each Selected program. Perform Mutation 1354 then randomly generates, for each Selected program, a portion of a program and inserts it at the mutation point. The portion inserted is typically a single point, but may be a sub-program.

Finally, the newly created programs are inserted into the population at 1360 and the process returns to the termination test 1304.

An audit trail can be created of the entire process from the creation of the initial population of individuals to the current population of individuals. In fact, compositions of LISP S-expressions provide an ideal way of representing audit trails. Suppose we denote the individuals of the initial population as I1, I2, I3, . . . These individuals can be either stored directly or one can store the random algorithm (and random seeds) used to generate the initial members. When a crossover is performed on two individuals (say I1 and I2, at point p of parent 1 and point q of parent 2), the LISP function LIST can be used to create an S-expression involving 5 items—namely, the symbolic string "CROSSOVER", the identities of the two individuals being crossed at the time (i.e. I1 and I2) and the two crossover points (i.e. p and q). In this example, the S-expression would be (CROSSOVER I1 I2 p q). This new string would be the identity (i.e. audit trail) of the newly created individual. If a crossover were later performed on the result of the first crossover illustrated above at point r, with initial individual I3 at point s, the audit trail of the resulting individual would be (CROSSOVER (CROSSOVER I1 I2 p q) I3 r s). If a subsequent crossover (or other operation) were performed on this individual, this string would, in turn, become an argument of a new LIST operation. Similarly, when a permutation is performed on an individual, the LIST can be employed to create an S-expression involving 3 items—namely, the symbolic string "PERMUTATION", the identity of the individual, and the permutation point. An example would be (PERMUTE I4 t) if the permutation operation had been performed on individual I4 at point t.

The first step in the iterative process involves activating each entity. Activation means having each entity attempt to accomplish its goal, producing an objective result. In the preferred embodiment, entities are computer programs, so activation requires executing the programs of the population. The second step in the process assigns a fitness value to the objective result, and associates that fitness value with its corresponding entity. For computer programs, the fitness value is generally a number, or a vector, which reflects the program's execution, although the fitness value could be any symbolic representation used on a computer.

In general, some of the entities will prove to be better than others when a value is assigned to them after their interaction with the "environment" of the problem. The best value (fitness) may be the lowest number (as is the case here where we are measuring the deviation between a result and a known perfect solution). In other problems, the best value (fitness) may be the highest number (e.g. scoring direct "hits"). The value (fitness) assigned may be a single numerical value or a vector of values, although it often most convenient that it be a single numerical value. In many problems, the best value is not known (e.g. The Traveling Salesperson Problem). However, even in such problems, it is known whether lower (or higher) numbers connote better fitness and the best value attained by the process at a given time can be identified.

A useful method for organizing raw fitness values involves normalizing the raw values, then calculating probabilities based on the normalized values. The best raw fitness value is assigned a normalized fitness of 1, the worst value is assigned a value of 0, and all intermediate raw values are assigned in the range of 0 to 1. The probability of being selected is determined by the equation:

$$P(i) = \frac{f_i}{\sum_{x=1}^{n} f_x}$$

Where P(i) is the probability of selection for individual i having a normalized fitness of fi, and n is the total number of the population. Thus, an individual's probability of being selected equals the individual's normalized fitness value divided by the sum of all the normalized fitness values of the population. In this way, the normalized fitness values range between 0 and 1, with a value of 1 associated with the best fitness and a value of 0 associated with the worst, and the sum of all the individual's probabilities equals 1.

It may also be desirable to remove individual computation procedures from the population with relatively poor fitness values. In practice, it may also be convenient to defer this activity briefly until a new generation of individuals is created.

It is a key characteristic of this overall process that the new populations of individuals tends to display, over a period of time, increasing average value (fitness) in the environment involved. Moreover, another characteristic of this overall process is that if the environment changes, the new populations of individuals will also tend to display, over a period of time, increasing average value (fitness) in the new environment involved.

At any given time, there is one individual in every finite population having a single fitness value that is the best amongst that population. Moreover, some environments have a known best fitness value. Examples are when fitness is measured as deviation from a known answer (e.g. the linear equations problem) or number of matches (e.g. the sequence induction problem). The present invention's process may occasionally generate an individual whose value (fitness) happens to equal the known best value. Thus, this overall process can produce the best solution to a particular problem. This is an important characteristic of the overall process, but it is only one characteristic. Another important characteristic (and the one which is more closely analogous to nature) is that a population of individuals exists and is maintained which collectively exhibits a tendency to increase their value (fitness) over a period of time. Also, by virtue of the many individuals with good, but not the very best, fitness values the population exhibits the ability to robustly and relatively quickly deal with changes in the environment. Thus, the variety in the population lowers its overall average value (fitness); additionally, the population's variety gives the population an ability to robustly adapt to changes in the environment.

In executing the overall process, it is often convenient to mark the one (or perhaps two) individuals in the population with the best fitness value amongst that population at any given time. Such marked best individuals are then not subject to removal (as parents), but are instead retained in the population from generation to generation as long as they remain the best. This approach prevents loss of the most fit individual in the population and also provides a convenient reference point for analytical purposes. If the problem involved happens to have a known best solution, after a certain number of generations, the best individual will often be the known best solution.

The third step involves selecting entities which will be used to perform operations. A number of selection methods exist which tend to select entities of relatively high value. The theoretically most attractive way to select individuals in the population is to do so with a probability proportionate to their fitness values (once so normalized between 0 and 1). Thus, an individual with fitness of 0.95 has 19 times greater chance of being selected than an individual of fitness value 0.05. Occasionally individuals with relatively low fitness values will be selected. This selection will be appropriately rare, but it will occur.

If the distribution of normalized fitness values is reasonably flat, this method is especially workable. However, if the fitness values are heavily skewed (perhaps with most lying near 1.00), then making the selection using a probability that is simply proportionate to normalized fitness will result in the differential advantage of the most fit individuals in the population being relatively small and the operation of the entire process being prolonged. Thus, as a practical matter, selection is done with equal probability among those individuals with relatively high fitness values rather than being made with probability strictly proportionate to normalized fitness. This is typically accomplished by choosing individuals whose fitness lies outside some threshold value. One implementation of this approach is to select a threshold as some number of standard deviations from the mean (selecting for example, all individuals whose fitness is one standard deviation from the mean fitness).

In connection with selection of individuals on the basis of fitness, we use the phrase "relatively high value" herein to connote either selection based on a probability proportionate to normalized fitness (the theoretically preferred approach) or selection with equal probability among those individuals having fitness values outside some threshold. In practice, choosing individuals from the best half with equal probability is a simple and practical approach, although fitness proportionate selection is the most justified theoretically.

After completion selection, the fourth step requires choosing an operation. The possible operations include crossover, permutation, and reproduction. The preferred operation is crossover, followed by reproduction, and lastly permutation. However, this preference is only a generalization, different preferences may work better with some specific examples. Thus the choice of operations should mainly be the preferred operation; but that choice should remain flexible to allow for solving differing problems.

As will be seen below, the key operation for introducing new individuals into the population is the crossover operation. To illustrate the crossover operation for this example, a group of two computational procedures is selected from among the population of individual S-expressions having relatively high fitness values, although, it is not necessary to limit the size of the group selected to two. Two is the most familiar case since it is suggestive of sexual reproduction involving a male parent and a female parent. The underlying mathematical process can obtain effective results by "crossing" hereditary information from three or more parents at one time. However, the key advantage of being able to combine traits from different individuals is attained with two parents. In its preferred form, all of the individuals in the group of parents have relatively high fitness values. In its most general form, the requirement is only that at least one of the individuals in the group of parents has a relatively high fitness value. The other parents in the group could be any member of the population. In either case, all mating involves at least one parent with relatively high fitness values.

Figure 4:
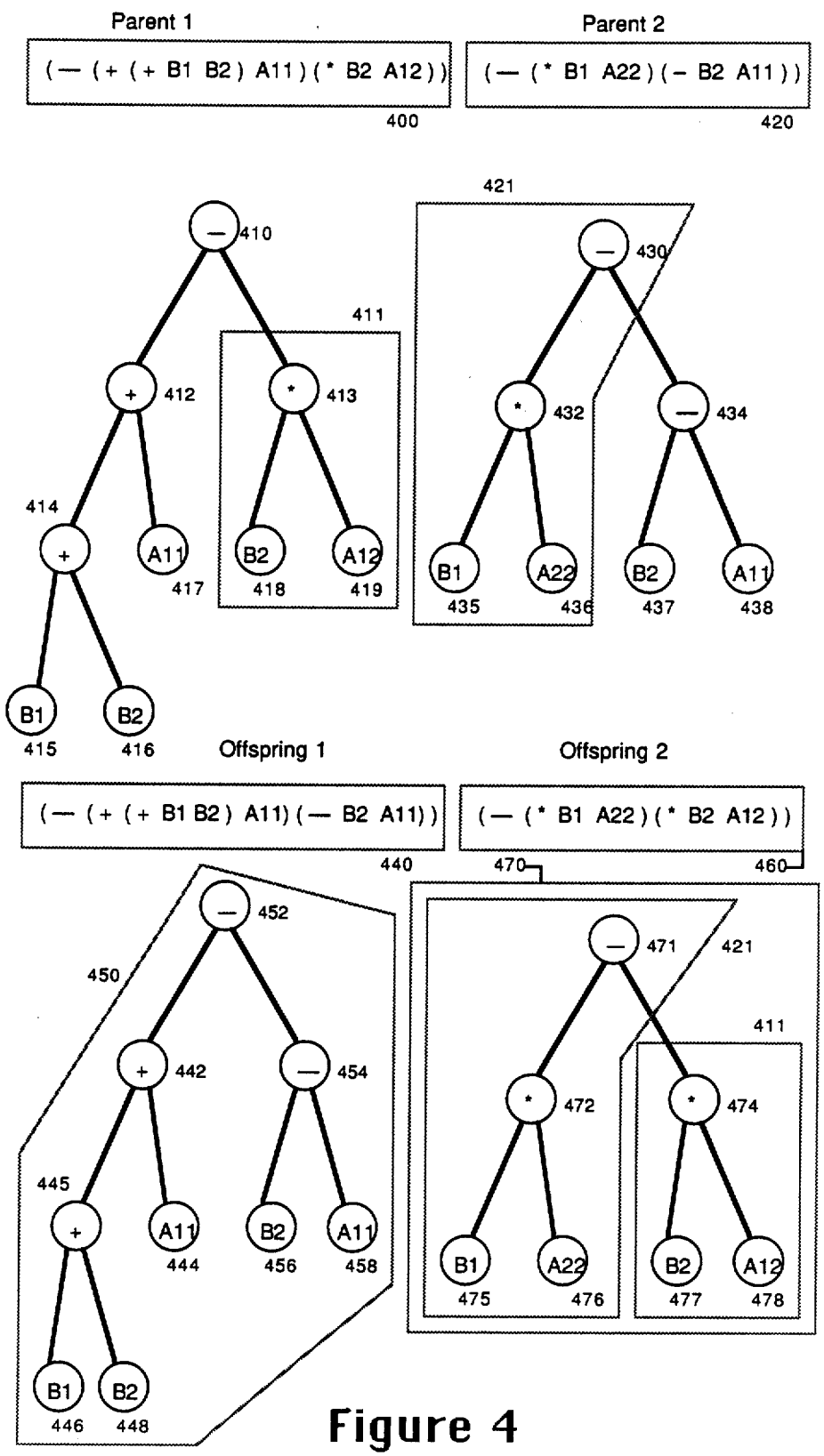
FIG. 4 is a tree diagram representation of a crossover operation occurring at internal points.

For purposes of this example problem, assume that a group of two parents with relatively high fitness values has been selected. The group of parents is now used to create two new computational procedures. FIG. 4 graphically illustrates a simple example of mating two parents to produce two new offspring for the example problem involving linear equations. It should be noted that there need not be precisely two offspring and some versions of the basic concept here produce only one offspring (or can produce more than two offspring).

Parent 1 is the computational procedure 400:

(−(+(+B1 B2) A11)(*B2 A12))

This computational procedure can also be represented by the rooted point-labeled tree with root 410. Root 410 is the subtraction function and has lines to two arguments, internal nodes 412 and 413. Node 412 is the addition function having lines to internal node 414 and leaf 417 (the variable A11), its arguments. Node 414 is the addition function having lines to leafs 415 and 416 (the variables B1 and B2, respectively). The root 410's second argument, node 413, is the multiplication function having lines to leafs 418 and 419 (the variables B2 and A12, respectively), its two arguments. Sub-tree 411 comprises 413, 418, and 419. Parent 2 is the computational procedure 420, (−(*B1 A22) (−B2 A11)). This computational procedure can also be represented as the rooted point-labeled tree with root 430. Root 430 is the subtraction function and has lines to two arguments, internal node 432 and 434. Node 432 is the multiplication function having lines to arguments at leafs 435 and 436 (the variables B1 and A22, respectively). Node 434 is the subtraction function having lines to arguments at leafs 437 and 438 (the variables B2 and A11, respectively). Tree 421 comprises 430, 432, 435 and 436, which is all of parent 2 except for the root 430's second argument.

Selecting the crossover point starts by counting up the internal and external points of the tree. The tree with root 410 has 9 points (410, 412, 413, 414, 415, 416, 417, 418, and 419). One of the 9 points (410, 412, 413, 414, 415, 416, 417, 418 and 419) of the tree for parent 1 (that is, the tree with root 410) is chosen at random as the crossover point for parent 1. A uniform probability distribution is used (so that each point has a probability of 1/9 of being selected). In this figure, point 413 is chosen. Point 413 happens to be an internal point of the tree.

Similarly, one of the 7 points (430, 432, 434, 435, 436, 437 and 438) of the tree for parent 2 (that is, the tree with root 430) is chosen at random as the crossover point for parent 2. In this figure, point 434 is chosen. Point 434 happens to be an internal point of the tree. Each of the 7 points has a uniform probability of 1/7 of being chosen.

Offspring 2 is produced by combining some of the traits of parent 1 and some of the traits of parent 2. In particular, offspring 2 is produced by substituting the sub-tree 411 (sub-procedure), beginning at the selected crossover point 413 [namely, (*B2 A12)] of parent 1, into the tree 421 of parent 2 at the selected crossover point 434 of parent 2. The resulting offspring 470 thus contains the sub-procedure 411 (*B2 A12) from parent 1 as a sub-procedure at point 474, which is attached to the second line from root 430 of tree 421. It is otherwise like parent 2 [that is, it has a root labeled with the subtraction function having (*B1 A22) as its argument]. This particular mating produces the computational procedure 460, (−(*B1 A22) (*B2 A12)), which is the known correct solution for the first variable x1 for a pair of two linear equations in two variables. In other words, the crossover involving parents 1 and 2 (neither of which were the correct solution to the linear equations problem) using the crossover points 413 and 434 happened to produce an offspring with best fitness (i.e. the known correct solution to the problem).

Offspring 1 is produced in a similar fashion by combining some of the traits of parent 1 and some of the traits of parent 2. In this case, the complementary portions of each parent combine. In particular, offspring 1 is produced by substituting the sub-tree (sub-procedure) beginning at the crossover point 434, (−B2 A11) of parent 2, into the tree of parent 1 at the crossover point 413 of parent 1. The resulting offspring 450 thus contains the sub-procedure (−B2 A11) from parent 2 as a sub-procedure at point 454. It is otherwise similar to parent 1. Root 452 is the subtraction function having lines to arguments at internal nodes 442 and 454. Node 442 is the addition function having lines to arguments at internal node 445 and leaf 444 (the variable A11). Internal node 445 is the addition function having lines to arguments at leafs 446 and 448 (the variables B1 and B2, respectively). Node 454 is the subtraction function having lines to arguments at leafs 456 and 458 (the variables B2 and A11, respectively).

Figure 5:
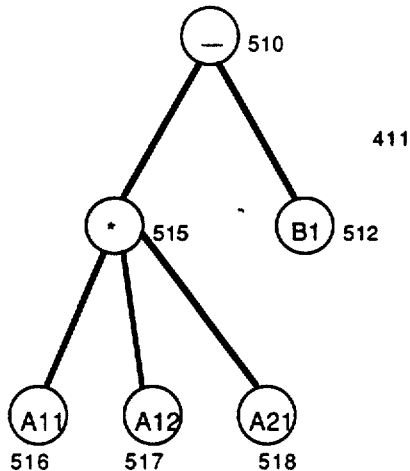
FIG. 5 is a tree diagram representation of a crossover operation occurring at external points.
Figure 5:
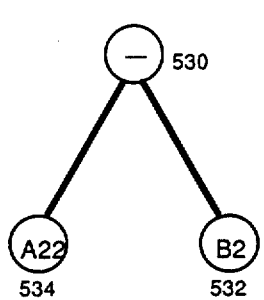
Figure 5:
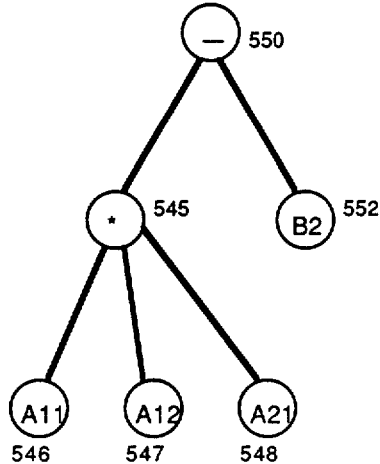
Figure 5:
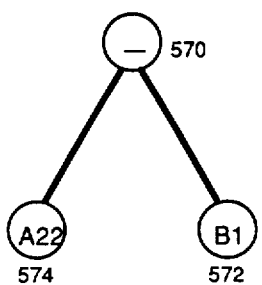

If two external points (leafs) of the tree had been chosen as crossover points, the crossover would have proceeded similarly with the labels (i.e. arguments) for the two points being exchanged. FIG. 5 illustrates the mating of two parents with crossover occurring only at external points (leafs) for the linear equations example problem. The first parent 500, (−(*A11 A12 A21) B1), is represented by the tree with root 510. Root 510 is the subtraction function having lines to arguments at internal node 515 and leaf 512 (the variable B1). Node 515 is the multiplication function having lines to arguments at leafs 516, 517, and 518 (the variables A11, A12, and A21, respectively). External point (leaf) 512 has been chosen as the crossover point for the first parent and contains the atomic argument of the variable B1. Note that, for purposes of illustrating the generality of functions, one of the functions (*) has 3 arguments (A11, A12 and A21) in this particular figure. The second parent 520 is represented by the tree with root 530. Root 530 is the subtraction function having lines to arguments at leafs 534 and 532 (the variables A22 and B2, respectively). External point (leaf) 532 has been chosen as the crossover point for the second parent and contains the atomic argument B2.

The result of the crossover operation is two new offspring 540 and 560. The first offspring 540, (−(*A11 A12 A21) B2), is represented by the tree with root 550. Root 550 is the subtraction function having lines to arguments at internal node 545 and leaf 552 (the variable B2). Node 545 is the multiplication function having lines to arguments at leafs 546, 547, and 548 (the variables A11, A12, and A21, respectively). This tree is identical to the tree with root 510 (i.e. parent 1) except that external point (leaf) 552 is now the argument B2 (instead of B1) from parent 2. The second offspring 560, (−A22 B1), is represented by the tree with root 570. Root 570 is the subtraction function having lines to arguments at leafs 574 and 572 (the variables A22 and B1, respectively). This tree is identical to the tree with root 530 (i.e. parent 2) except that external point (leaf) 572 is now the argument B1 (instead of B2) from parent 1. Thus, the arguments B1 and B2 have been crossed over (exchanged) to produce the two offspring.

Figure 6:
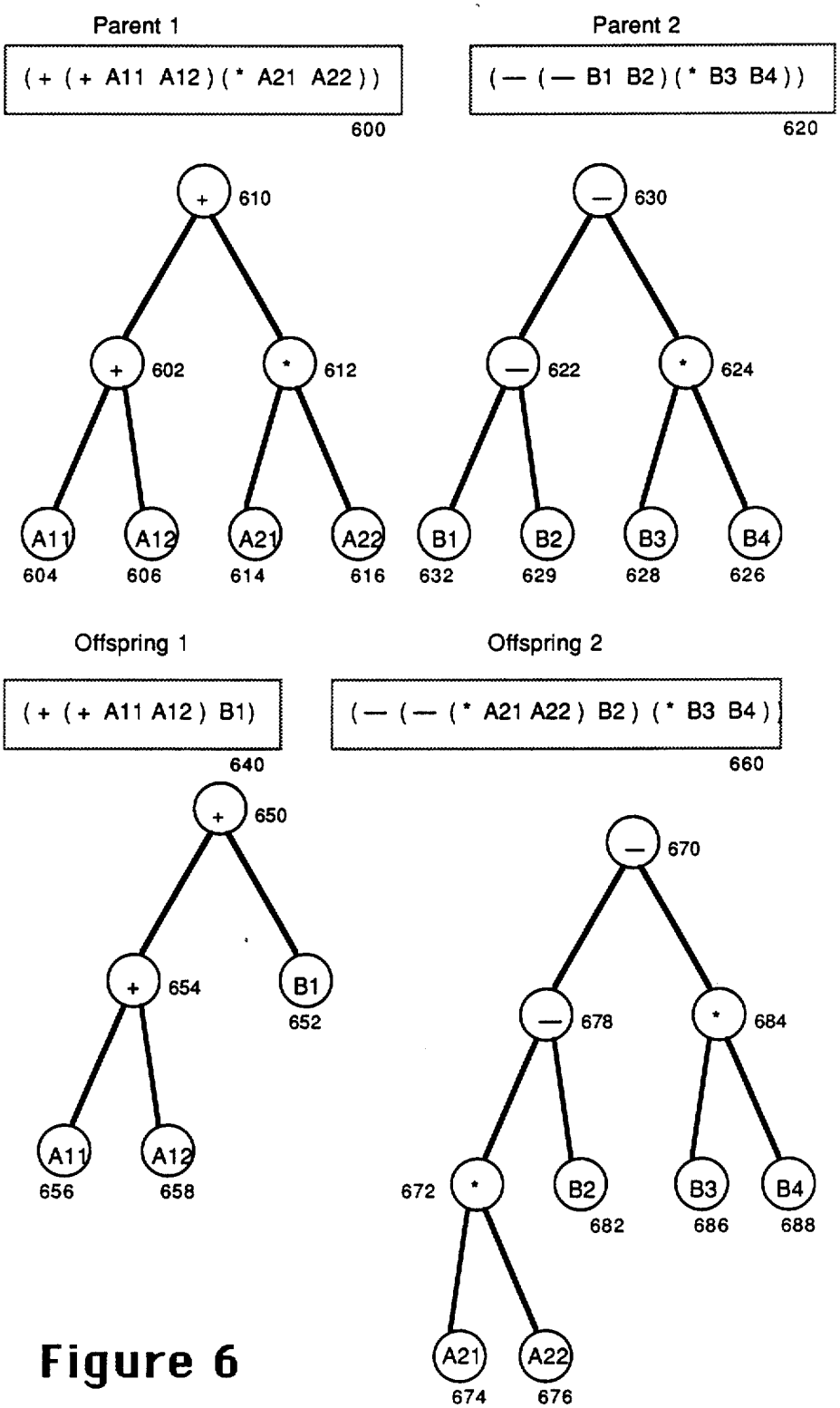
FIG. 6 is a tree diagram representation of a crossover operation occurring at an internal and an external point.

FIG. 6 illustrates the mating of two parents with crossover occurring at one internal point (i.e. a point labeled with a function) and one external point (i.e. a point labeled with an atomic argument). The first parent 600, (+(+A11 A12) (*A21 A22)), is represented by a tree with root 610. Root 610 is the addition function having lines to arguments at internal nodes 602 and 612. Node 602 is the addition function having lines to arguments at leafs 604 and 606 (the variables A11 and A12, respectively). Node 612 is the multiplication function having lines to arguments at leafs 614 and 616 (the variables A21 and A22, respectively). Internal point 612 has been chosen as the crossover point for the first parent. The second parent 620, (−(−B1 B2) (*B3 B4)), is represented by a tree with root 630. Root 630 is the subtraction function having lines to arguments at internal nodes 622 and 624. Node 622 is the subtraction function having lines to arguments at leafs 632 and 629 (the variables B1 and B2, respectively). Node 624 is the multiplication function having lines to arguments at 628 and 626 (the variables B3 and B4, respectively). External point 632 has been chosen as the crossover point for the second parent.

The result of the crossover operation is two new offspring. The first offspring 640, (+(+A11 A12) B1), is represented by the tree with root 650. Root 650 is the addition function having lines to arguments at internal node 654 and leaf 652 (the variable B1). Node 654 is the addition function having lines to arguments at leafs 656 and 658 (the variables A11 and A12, respectively). This tree is identical to the tree with root 610 (i.e. parent 1) except that the second argument of the function + (addition) 652 is now the single argument (atom) B1 from parent 2. The second offspring 660 (−(−(*A21 A22) B2)(*B3 B4)), is represented by the tree with root 670. Root 670 is the subtraction function having lines to arguments at internal nodes 678 and 684. Node 678 is the subtraction function having lines to arguments at internal node 672 and leaf 682 (the variable B2). Node 672 is the multiplication function having lines to arguments at leafs 674 and 676 (the variables A21 and A22, respectively). Node 684 is the multiplication function having lines to arguments at leafs 686 and 688 (the variables B3 and B4, respectively). This tree is identical to the tree with root 630 (i.e. parent 2) except that the internal point 672 (i.e. the first argument of the subtraction function 678) is now a function (multiplication) instead of the atomic argument of the variable B1.

Thus, regardless of whether internal or external points are selected as crossover points on the trees of the parents, the result of the crossover operation is that offspring are produced which contain the traits of the parents. In fact, the offspring resulting from crossover consist only of sub-procedures from their parents. To the extent this is not entirely the case in actual practice, the result can be viewed as having been the result of applying crossover to the parents and then allowing a mutation (random variation) to occur. The crossover operation has the properties of closure and being well-defined.

Occasionally, a given individual may be mated with itself. In the conventional genetic algorithm involving binary strings, crossover with identical parents merely creates two copies of the original individual. When computational procedures are involved, an individual mating with itself generally produces two different individuals (unless the crossover points selected happen to be the same).

The three examples of mating with crossover were presented above in terms of the graphical representation of the computational procedures. Graphical representations are especially suited to demonstrating the "cut and paste" character of the crossover operation. In addition, the graphical method of representation is a general way of representing functions and the objects they operate on (whether computational procedures or machines) and is also not inherently associated with any particular programming language or any particular mode of implementation. As previously discussed, the computer language LISP is preferred for actually implementing these processes on a computer.

In FIG. 6, the mating of two parents with crossover occurring at one internal point and one external point is illustrated. FIG. 6 will be referred to in the following discussion since it encompasses the principles involved in both FIGS. 4 and 5. Parent 1 in FIG. 6 was the LISP computational procedure (+(+A11 A12) (*A21 A22)) and parent 2 in FIG. 6 was the LISP computational procedure (−(−B1 B2) (*B3 B4)). Using LISP computational procedures, the mating of the two parents is implemented in the following way.

First, the number of functions and atomic arguments in the LISP S-expression 600 in FIG. 6 are counted. For LISP S-expression 600, there are 3 functions (i.e. 2 occurrences of + and 1 occurrence of *) and there are 4 atomic arguments (i.e. A11, A12, A21 and A22). The total count is 7. This counting can be easily performed in LISP in a variety of well-known ways. One especially simple way makes use of such basic LISP functions as CAR and CDR, which are built into the microcode of microprocessor chips that are especially designed to handle LISP (such as found in the Texas Instruments Explorer II computer). The CAR function in LISP allows one to examine the first item of any list. Here the first item in computational procedure 600 is the first + function (i.e. the addition function appearing just inside the outermost left parenthesis). The "+" is identified as a function and included in the overall count. Meanwhile, the CDR function eliminates the first item of the list by returning a list comprising all but the first item. Thus, the remainder of the computational procedure (which is now smaller than the original computational procedure 600 by the first element +) can be subjected to similar handling in a recursive way.

Secondly, having counted the number of functions and atomic arguments in the computational procedure 600, a random number generator is called to select a number between 1 and 7 with uniform probability (i.e. probability of 1/7 for each of the 7 possibilities). Such random number generators are well-known in the art and often included in a package of utility functions provided by computer manufacturers to users of their computers. Texas Instruments provides a random number generator or generating a random integer within certain bounds using a uniform probability distribution. If the random number generator selects the integer 5, then the multiplication function *(shown graphically at point 612) would be chosen as the crossover point for parent 1. This identification is most simply accomplished by numbering the functions and atomic arguments in the same order as the counting function encountered them (although any ordering might be used for this purpose). In particular, the crossover point is the first element of the sub-list (*A21 A22). This sub-list is the third element of the list 600. Note that in LISP, a computational procedure is represented by a list—an ordered set of items found inside a pair of parenthesis.

Similarly, the functions and atomic arguments in computational procedure 620 can be counted. The count for parent 2 would thus be 7. In this example, the atomic argument B1 is selected as the crossover point for parent 2. This atomic argument happens to be in the second top-level element of the list 620—namely, the sub-list (−B1 B2). In fact, B1 is the second element of this second top-level element of list 620.

The third step involves finding the "crossover fragment" for each parent. When the crossover point for a given parent is an atomic argument, then the "crossover fragment" for that parent is simply the atomic argument. Thus, for example, the crossover fragment for parent 2 is the atom B1. On the other hand, when the crossover point for a given parent is a function, then the "crossover fragment" for that parent is the entire list of which the function is the first element. Thus, for example, the crossover fragment for parent 1 is the entire list (*A21 A22). By producing a "crossover fragment", portions of each parent combine to produce offspring.

In the above case, the list has no sub-lists. However, if this list contained a sub-list (that is, an argument that was itself a function of other arguments), then it is carried along also. This point about sub-lists can be easily illustrated by supposing that the first element of list 600 had been chosen as the crossover point (instead of the multiplication * function). This first element is the function +. Then the crossover fragment associated with this crossover point is the entire original list 600—that is, the list consisting of the function + and the 2 sub-lists (+A11 A12) and (*A21 A22).

The fourth step is to produce offspring 1. Offspring 1 is produced by allowing parent 1 to perform the role of the "base" ("female") parent and parent 2 to perform the role of the "impregnating" ("male") parent. In general, an offspring is produced within the female parent by replacing the crossover fragment of female parent with the crossover fragment of the male parent. In particular, the crossover fragment of the female parent [the entire list (*A21 A22)] is replaced within the female parent by the crossover fragment of the male parent (the atomic argument B1). The resulting offspring 1 is thus: (+(+A11 A12) B1).

The fifth step is to produce offspring 2. Offspring 2 is produced by allowing parent 2 to perform the role of the "base" ("female") parent and parent 1 to perform the role of the "impregnating" ("male") parent. In particular, the crossover fragment of the female parent (the atomic argument B1) is replaced by the crossover fragment of the male parent [the list (*A21 A22)]. The resulting offspring 2 is thus: (−(−(*A21 A22) B2) (*B3 B4)).

Thus, two parents can produce two offspring. In some variations of the process, only one offspring is produced from a designated male-female pair; however, it is most convenient to have two parents produce two offspring (since, among other things, this produces the convenient, although not necessary, side effect of maintaining the population size at a constant level). In this preferred implementation of the crossover process, each offspring is composed of genetic material that came from either its male parent or its female parent. The genetic material of both parents finds its way into one of the two offspring.

For the operation of reproduction, one computational procedure with relatively high fitness is selected from among the computational procedures in the population. This computational procedure is retained in the population unchanged. The preferred method for selecting computational procedures for reproduction is to select them with a probability proportional to their normalized fitness. In other words, there is survival and reproduction of the fittest amongst the computational procedures in the population. One consequence of the reproduction operation is that individuals in the population with relatively low fitness values are progressively removed from the population.

It should be noted that the reproduction operation introduces nothing new to the population. If only reproduction operations were performed, no new individuals would be created. In fact, if only reproduction occured, there would be progressively fewer and fewer different individuals in the population (although the average fitness of the population would tend to increase). The reproduction operation has the properties of closure and being well-defined.

Figure 7:
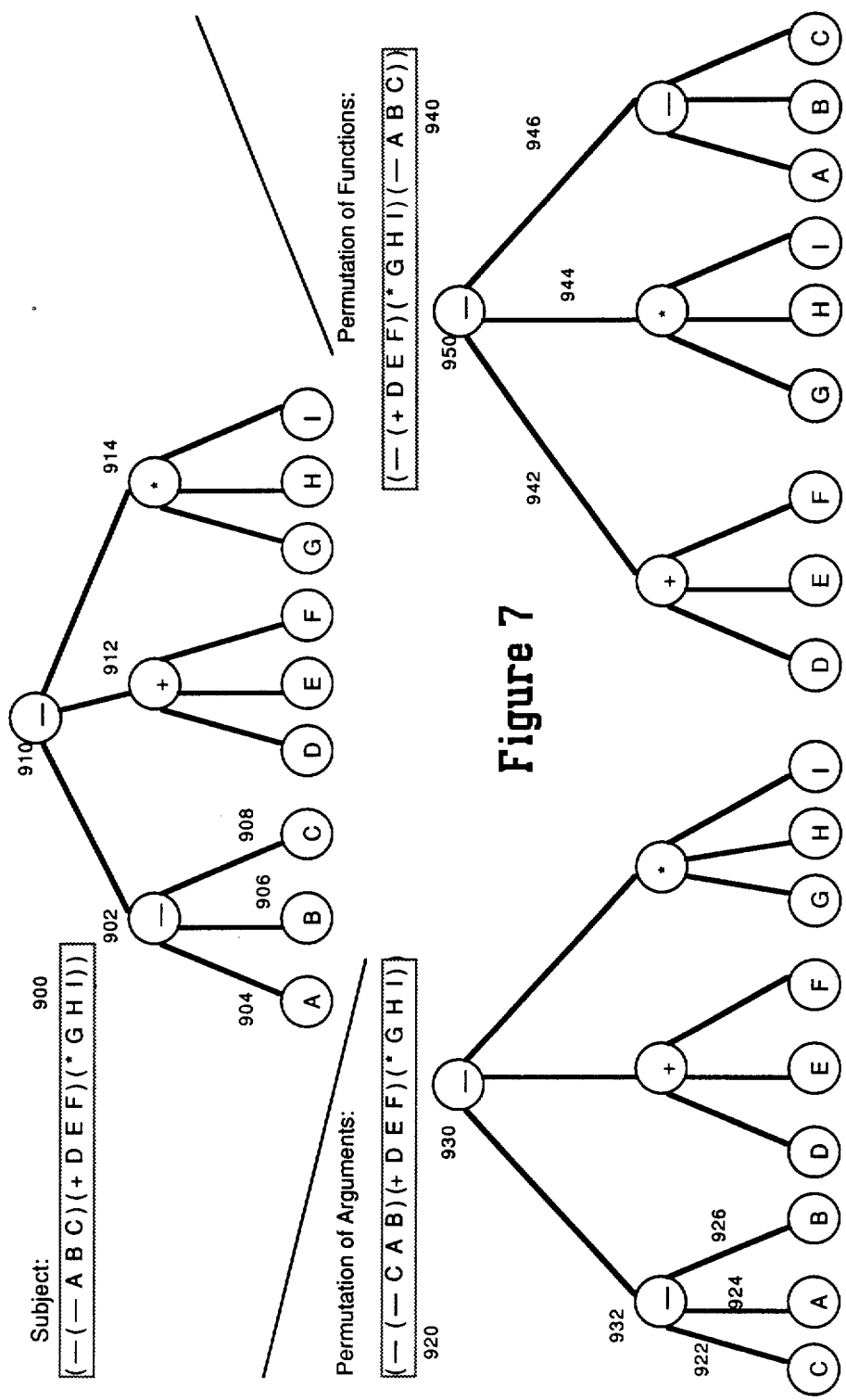
FIG. 7 is a tree diagram representation of a permutation operation.

Reproduction of the fittest and crossover are the basic operations for varying and improving the population of individual computational procedures. In addition, there is a permutation operation. Permutation operates on a single subject and produces a single computational procedure. The permutation operation has the properties of closure and being well-defined. FIG. 7 illustrates the permutation operation on a computational procedure.

The permutation operation is also performed on an individual in the population with relatively good fitness.

One purpose of permutation is to introduce a new order among existing sub-procedures of a given computational procedure (possibly allowing some new possibility for adaptation to emerge). However, the chances of this happening are relatively remote (just as the chance of a random mutation producing a mutant with high fitness is remote). The most important purpose of permutation is, however, to improve various sub-procedures within a given computational procedure already having high fitness. Potentially, a new order for existing sub-procedures within a computational procedure already having high fitness will be less subject to disruption due to the operation of the crossover operation.

In FIG. 7, the subject computational procedure 900, (−(−A B C) (+D E F) (*G H I)), is represented by a tree with root 910. Root 910 is the subtraction function and has lines to arguments at internal nodes 902, 912 and 914. Node 902 is the subtraction function and has lines to arguments at leafs 904, 906 and 908 (the variables A, B, and C, respectively). Node 912 is the addition function and has lines to arguments at leafs with the variables D, E, and F. Node 914 is the multiplication function and has lines to arguments at leafs with the variables G, H, and I.

Only internal points are selected for the permutation operation. To accomplish this, the internal points are counted and one of them is chosen at random from among the possibilities using a uniform probability distribution. The tree with root 910 has four internal points (910, 902, 912, and 914). Once the permutation point is chosen, all the lines radiating downwards from that point are permuted (i.e. re-ordered) at random. If there are K lines radiating from a given permutation point, then there are K-factorial possible permutations. Thus, if K is 3 (as it is for internal point 902), then there are six possible permutations (i.e. 3 times 2 times 1) possible at the permutation point 902.

One of the six possible permutations is chosen at random using a uniform probability distribution over the six possibilities. One of the six possible permutations of three items permutes the items A, B, C to C, A, B. Suppose this one was chosen. The computational procedure 920, (−(−C A B) (+D E F) (*G H I)), is represented by the tree with root 930; it is the tree that results when this particular permutation is applied to the tree with root 910 using the permutation point 902. In this new tree 930, the first line 922 radiating from the internal point 932 ends with the label C (instead of A as at 904). The second line 924 radiating from internal point 932 ends with the label A (instead of B as at 906). The third line 926 radiating from internal point 932 ends with label B (instead of C as at 908). The second and third lines from 930 have the same arguments as the second and third lines from root 910. Thus, the permutation of A, B, C to C, A, B at permutation point 902 has been effected. If a particular permutation happens to exactly reverse the order of items, it is called an inversion.

If internal point 910 had been chosen as the permutation point, the computational procedure 940, (−(+D E F) (*G H I) (−A B C)), represented by the tree having root 950 would be the result. In this tree, the first line 942 radiating downwards from root 950 ends with the label + (addition). The second line 944 radiating downwards from internal point 950 ends with the label * (multiplication). The third line 946 radiating downwards from internal point 950 ends with the label − (subtraction). Thus, the three items −, +, * from tree 910 are permuted into the new order +, *, −. Each function has the same arguments as the corresponding tree with root 910. If one views the permutation operation as operating on the lines radiating downwards from the chosen point of permutation, there is no fundamental difference between the permutation of arguments illustrated by 920 and the permutation of functions illustrated by 940. The two are included here for the sake of illustration.

Another possible step in the present invention's process is mutation. The mutation operation alters a randomly selected point within an individual. It has the properties of closure and being well defined. Mutation, if performed at all, is performed on only a tiny fraction of alleles in a tiny fraction of entities in the population. It is preferably performed on randomly selected individuals in the population having a relatively high fitness. The purpose of mutation is not to accidently create a mutant individual with extremely high fitness and thereby improve the population (although there is a very remote possibility that this may happen). Mutation does, however, perform one role which is occasionally useful—namely, it provides a way to introduce (or reintroduce) new genetic material into the population.

Generally, with even a modestly sized population, all the possible gene values (alleles) will be represented somewhere in the population. This is almost certainly going to be the case in the initial population if it is at least modestly sized and if it is generated at random. In fact, a potential pitfall of priming an initial population (especially if 100% of the initial population comes from priming) is the possibility of accidently limiting the search possibilities to only a portion of the potential search space. However, in the course of removing individuals with low fitness, there is a remote possibility that particular alleles may actually disappear completely from a population. There is also a remote possibility later the vanished alleles may become necessary to achieve the next level of advance in fitness. To forestall this remote conjunction of possibilities, the mutation operation may prove useful. By randomly altering an allele in a tiny number of randomly chosen individuals from time to time, the mutation operation may reintroduce a vanished allele back into a population.

Finally, the results of the chosen operation are added to the population. When new individual computational procedures are created by any operation, they are added to the existing population of individuals. The process of executing the new computational procedures to produce a result and then assigning a value to the results can be immediately performed. Thus, if the next step terminates the iterative process, the newly created computational procedures will have a fitness value.

Figure 8:
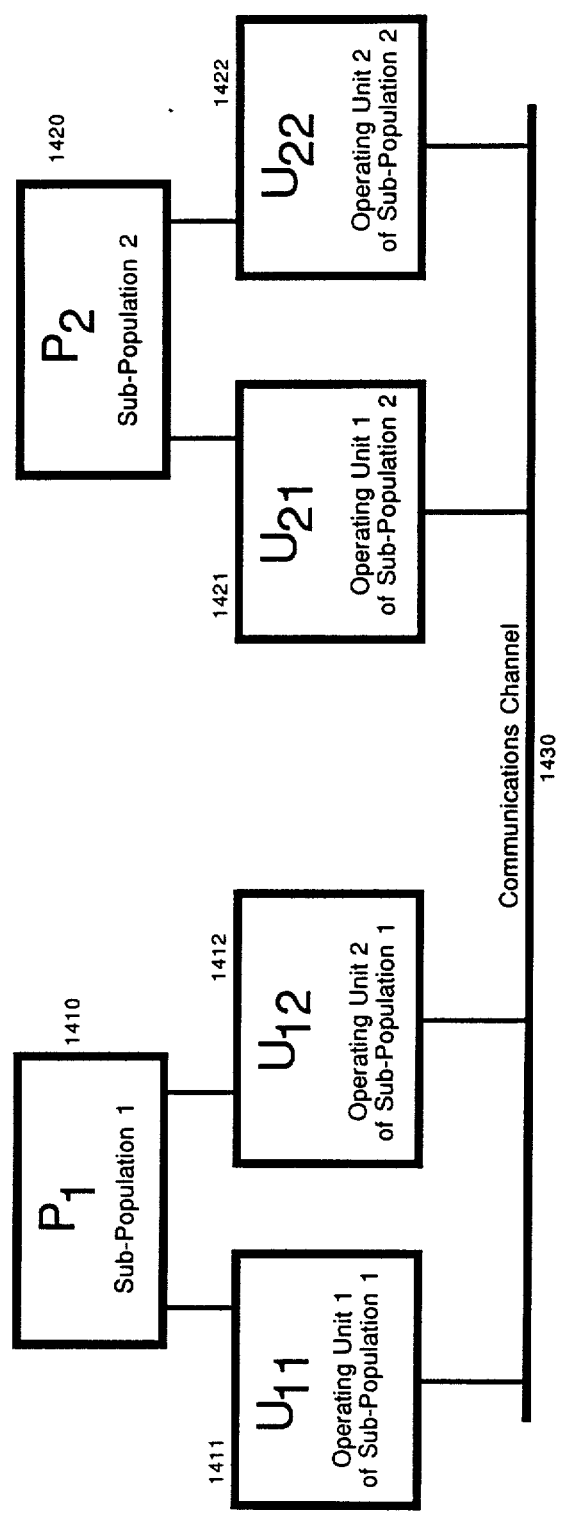
FIG. 8 is a block diagram of the parallel processing embodiment of the present invention.

The process of the present invention can benefit greatly from parallel operation. By using parallel processing, the overall rate of activity rises in almost direct proportion to the number of activities performed simultaneously. FIG. 8 is a block diagram depicting parallel processing of the present invention using two sub-populations each having two operating units. Sub-population $P_1$ 1410 is coupled to operating units $U_{11}$ 1411 and $U_{12}$ 1412. Sub-population $P_2$ 1420 is coupled to operating units $U_{21}$ 1421 and $U_{22}$ 1422. Communications channel 1430 couples all four operating units. FIG. 8 illustrates two sub-populations each with two operating units; however, in general, there can be an arbitrary number of sub-populations and arbitrary number of operating units involved.

Two types of parallel activity can occur. In the first type, each of the operations (crossover, reproduction, permutation, etc.) are performed simultaneously in parallel on different entities (or different groups of entities for crossover) selected from a given population of individuals. If the entities are computer programs, parallel processing is accomplished by a computing machine having multiple operating units (control and arithmetic) capable of simultaneously working on entities selected from a particular single computer memory area.

To show this first type of parallel processing, consider operating units $U_{11}$ 1411 and $U_{12}$ 1412 which are coupled to sub-population $P_1$ 1410. Each operating unit can access the sub-population to select entities for the operations based on their relative fitness, followed by performing the operation, adding new programs, and the rest of the iterative process simultaneously.

The second type of parallel processing involves simultaneously occurring activity in two or more different sub-populations. To show this type of parallel processing, consider sub-population $P_1$ 1410 and sub-population $P_2$ 1420. While $P_1$'s two operating units operate on $P_1$, $P_2$'s two operating units operate on $P_2$. Both types of parallelism are highly efficient because very little information need be communicated along the communication channel 1430. In addition, each operating unit need perform only a few very simple activities in response to the information received from the communications channel 1430.

Communication and coordination is performed by communications channel 1430, which couples all the operating units associated with the various sub-populations. In a computer, the communication channel is a communication bus.

To illustrate the efficiency of parallel processing, let us suppose that selection is performed using probabilities proportionate to fitness. The computation of this probability for a particular individual typically requires two pieces of information—namely, the value (fitness) assigned to the result of executing the particular individual and the total of all such values for all individuals in the entire population. Typically this calculation is performed by dividing the individual's assigned value (fitness) by the total for the entire population. Once the total has been once computed for the initial entire population, the total is easily modified by incrementing it for each newly created individual and by debiting it for each individual that is removed.

This simple computation can be performed by each operating unit whenever it receives information via the communications channel 1430 about any insertion or removal of an individual in the population. Similarly, each operating unit must transmit information along the communications channel 1430 to all other operating units whenever it inserts or removes any individual from the sub-population which it accesses. The message consists of the increment (in the case of an insertion) or the decrement (in the case of a removal) in the total value (fitness) of the population. Note that these messages are relatively short and require very little effort to send and act on in comparison to the considerably larger effort needed to perform the iterative process. Because processing messages is relatively minor in comparison to performing the genetic algorithm, the overall rate of activity in this parallel configuration rises almost in direction proportion to the number of activities being performed in parallel. In the case of computer programs, the benefits of parallel activity (using parallel operating units accessing parallel sub-populations) is manifested in terms of a rate of overall computer processing activity, rising almost in direct proportion to the number of parallel activities. That is, the amount of computation performed per unit of time rises almost in direct proportion to the number of parallel activities.

From time to time, the communications channel is also used to exchange large groups of individuals between the sub-populations so that each sub-population receives new genetic material that have achieved relatively high values of fitness from other sub-populations. These occasional transmissions of information add to the administrative overhead of a parallel system; however, because they occur only occasionally (i.e. after many generations of acitivity confined to the sub-populations), they have only a minor effect on the overall efficiency of the parallel configuration.

Three examples of the present invention involving linear equations, sequences, and the traveling salesman problem follow.

SOLVING LINEAR EQUATIONS

In this example, the environment in which adaption takes place consists of n sets of two consistent non-indeterminate linear equations in two variables. If we delete the subscripts identifying the particular pair of equations involved, the typical equation pair is:

$$A11\ X1 + A12\ X2 = B1$$

$$A21\ X1 + A22\ X2 = B2$$

Without loss of generality, the coefficients of each pair of equations have been normalized so that the determinant is 1. This particular problem has a known mathematical solution for the first variable (x1) which, if written as an S-expression in the LISP programming language, is (−(*B1 A22) (*B2 A12)). A similar S-expression gives the solution for the second variable (x2). A natural metric for evaluating an S-expression's proffered solution is the sum of the deviations from the known mathematical solution produced by the proffered S-expression. This sum is the aggregate, over the series of all pairs of equations, of the Euclidean distance between the proffered solution point and the known actual solution point. A sum of zero for a particular S-expression means the expression is a perfect solution. A very small sum represents the kind of solution acceptable in practice from a digital computer. Since the solution for the second variable (x2) is directly derivable from either of the two (consistent) equations of a given pair, a proffered solution to this problem can be viewed as simply a single valid S-expression whose return value is the solution for the first variable (x1) for each pair of equations in the series. The proffered solution can then be evaluated by deriving the solution for the second variable from the first; then computing the Euclidean distance. Finally the distances are accumulated over the series. This approach happens to make the atomic arguments A12 and A22 extraneous to the solution for the variable (x1).

Figure 9:
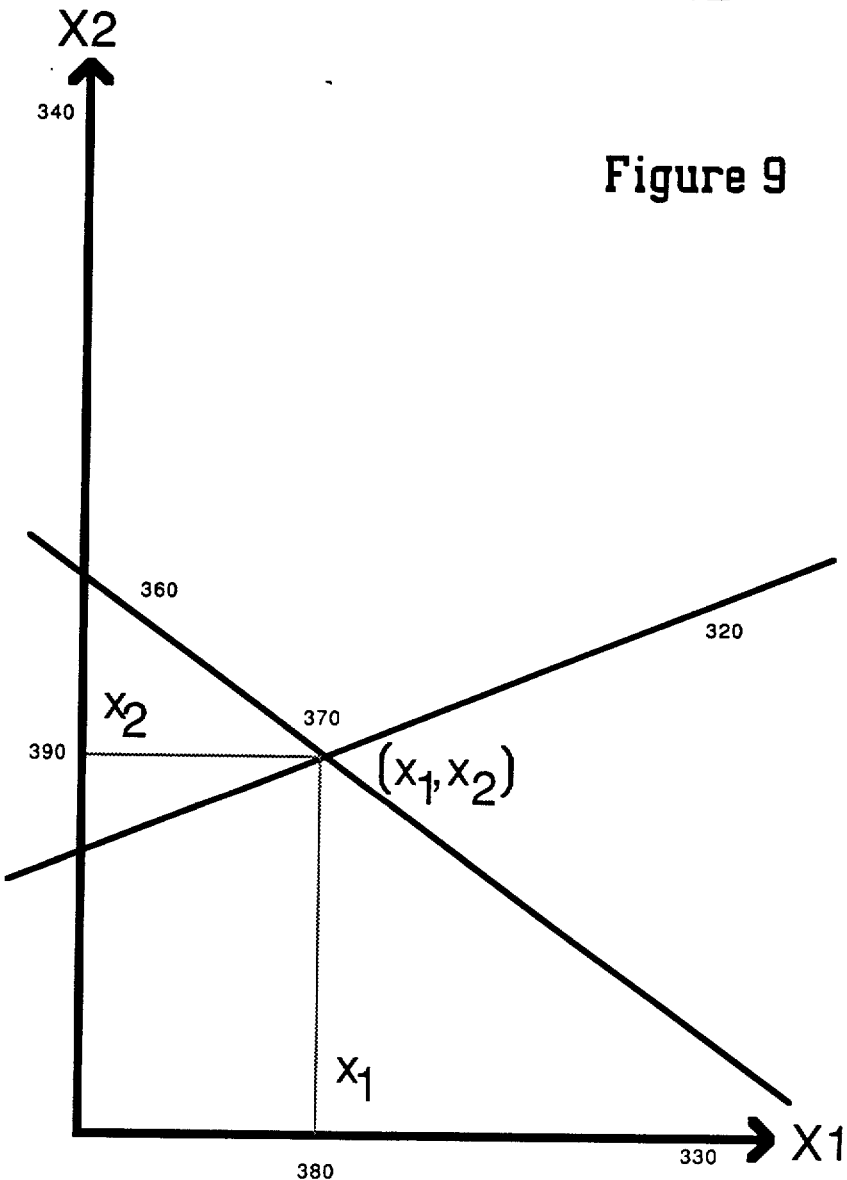
FIG. 9 is a chart diagram of the linear equation problem.

FIG. 9 shows a pair of linear equations having two variables x1 and x2. In FIG. 9, the first equation 310 corresponds to the straight line 320 drawn on the plane defined by the horizontal axis X1 330 and vertical axis X2 340. The second equation 350 corresponds to the straight line 360 drawn on the same plane. The point of intersection 370 has a coordinate 380 (x1) along the horizontal axis X1 330 and a coordinate of 390 (x2) along the vertical axis X2 340.

The universe from which proffered solutions for the first variable x1 consists of any valid LISP S-expression (with any level of embedding of functions) constructed from the useful input atomic arguments (A11, A21, B1, and B2), the extraneous input atomic arguments (A12 and A22), the useful functions of multiplication and subtraction (* and −), and the extraneous function of addition (+). The presence of an extraneous function and arguments tends to make this example problem more realistic.

The search space in which the solution to this problem lies is thus a very large, non-linear, non-continuous space of rooted trees whose points are labeled with various mathematical symbols (either functions or arguments). A large number of possible tree structures can represent valid LISP S-expressions, even if one arbitrarily limits the level of embedding and all the functions have only two arguments. In addition, there are many ways of labeling the internal points of these trees with the available functions and there are many ways of labeling the external points (leafs) of these trees with the available arguments. Some LISP S-expressions in the search space equal mathematically, the most parsimonious solution cited above [for example, adding in (−A11 A11) to the solution]. However, these occasional numerically equivalent S-expression provide no usable simplification of the problem or usable reduction of the combinatorially large number of possible S-expressions involved here.

Solving these problems starts by generating a population of individual S-expressions using the functions *, −, and + and the atomic arguments A11, A12, A21, A22, B1, and B2. The initial population can be generated entirely at random. That is, starting at the top of the tree, one of the available functions or arguments is chosen at random. If an atomic argument is chosen as this first choice, the process is complete and the S-expression consists of this single atom. If a function is chosen, the process continues. If the function chosen requires K arguments (and K is 2 for all three of the functions in this problem example), then a similar random selection is made for each end-point of each of K lines radiating downwards from the initial point. That selection is also made at random and may be an atomic argument or a function. If an atomic argument is selected, that particular point becomes an external point (leaf) on the tree and no further attention is paid to that line. If a function is selected, then the process continues recursively with additional selections being made in the same manner. When, at some point, atomic arguments have been selected for all external points, the process of randomly constructing the tree is then completed. The initial population is merely a random subset of the domain in which the subsequent search is to take place.

For some problems, the system can be primed by including some S-expressions (or some portions of S-expressions) which are believed to be important in dealing with the problem at hand. In addition, the operation of the system may be interrupted at any point and re-started with the population of individuals existing at the end of the previous run. That method of re-starting operations can be viewed as priming the system with an entire population.

Figure 10:
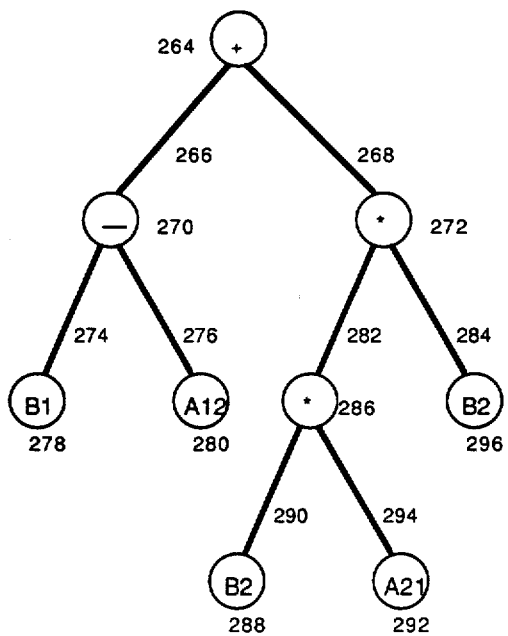
FIG. 10 is a tree diagram representation of an S-expression which is a member of initial population for solving the linear equation problem of the present invention.

FIG. 10 is an example of randomly generating an initial population of S-expressions using the example expression 262, which is:

(+(−B1 A12) (* (*B2 A21) B2))

Starting at the root 264 of the tree, one of the available functions (*, +, or −) or one of the available atomic arguments (A11, A12, A21, A22, B1 or B2) is selected. In this figure, the function + (addition) was selected at random to appear at the root 264 of the tree. Since this function has two arguments, there are two lines 266 and 268 radiating downwards from the internal point 264. For the endpoint 270 of the line 266 and endpoint 272 of the line 268, another similar random selection must be made from the set of available functions or available arguments. For point 270, the function − (subtraction) has been selected. Since this function also has two arguments, there are two lines 274 and 276 radiating downwards from point 270. For the endpoint of each such radiating line, a similar random selection must be made. Here, the variable B1 has been selected for the endpoint 278 of the line 274. Since B1 is an atomic argument, that completes the process for this branch of the tree. Also, the variable A12 has been selected for the endpoint 280 of the line 276. This completes the process for the line 266 radiating downwards from the root 264.

For the second argument of root 264 at the internal point 272, a function * (multiplication) has been selected. Since this function has two arguments, two lines 282 and 284 radiate downward from point 272. For point 286 at the end of line 282, another function * (multiplication) has been selected. The endpoint 288 of the first line 290, which radiates downward from point 286, has the atomic argument of the variable B2. The endpoint 292 of the second line 294, which radiates from point 286, has the atomic argument of the variable A21. Similarly, the line 284 radiating downward from point 272 has the atomic argument of the variable B2 at its endpoint (leaf) 296. This completes the random generation of the tree and corresponding S-expression.

Shown below are some examples of possible S-expressions for this example which could have been generated at random as the initial population of individuals:

(1) (+A11 A12)
(2) (−(*B1 B2) A22)
(3) (+(−B1 A12) (* (*B2 A21) B2))

Examining one of these expressions, example (1) consists of the sum of the coefficients of the first linear equation. Its interpretation is the solution for the first variable (x1) in a system of two linear equations in two variables always equals the sum of A11 and A12, regardless of any of the other coefficients or constants in the equations. One would expect this wrong expression to usually produce proposed solutions which are far from the correct solutions. Of course, this incorrect S-expression might occasionally, by coincidence, produce the correct solution for a particular pair of equations.

Once the population of individuals is generated, each of the S-expressions in the population is executed (i.e. evaluated in LISP) to produce a result. In LISP, each S-expression can be executed to return some kind of numerical, symbolic, logical, or other result. In practice, this execution is repeated over a series (i.e. different games for the Prisoner's Dilemma and different pairs of linear equations for the current example problem) to avoid accidentally misleading conclusions. By performing this evaluation over a series of different situations, a better measure of performance is obtained.

For example, (+A11 A12) might give the correct solution to the first variable (x1) for some unusual set of linear equations in two variables, though not the solution to the problem in general.

For purposes of this example problem and in order to simplify the discussion, the "result" of evaluating the S-expression here is simply a numerical value for the first variable x1. As previously mentioned, if the possibility of parallel lines (i.e. inconsistent equations) were allowed in this example, the "result" might be either numeric or symbolic. Alternately, the "result" could be the pair (vector) of numbers (x1, x2) specifying the coordinates of the point in the plane where the two lines intersect. Once the result of the execution of the computational procedure (S-expression) takes place, the result can be assigned a value in the particular environment involved for the particular problem involved.

In the case of this example problem, the solution for the second variable (x2) is directly derivable from the first variable (x1) using either of two (consistent) equations of a given pair of equations. The variables x1 and x2 correspond to a point in the plane (the point whose horizontal coordinate is x1 and whose vertical coordinate is x2) while the actual solution corresponds to another point in the plane. The distance between the two points in the plane can be computed. The distance obtained by evaluating the S-expression using the other pairs of linear equations can be similarly computed. The cumulative distance provides a natural measure of value (fitness) of a particular individual S-expression in this environment. If the sum of these distances for a particular individual S-expression is zero, then the S-expression has the best value (best fitness) in this environment because it produces points of intersection that are exactly correct in each case (i.e. have zero distance, in each case, from the correct points).

INDUCTION ON SEQUENCES

In this example problem, the environment in which adaptation is to take place consists of a single given sequence:

$$S_0, S_1, S_2, S_3, \ldots, S_i, \ldots$$

The goal is to produce a computational procedure (S-expression) for the sequence (that is, a computational procedure which gives $S_i$ for any index i). A proffered solution to this sequence induction problem consists of a LISP S-expression using the argument INDEX which gives the value of the sequence for position INDEX of the sequence. The first element of a sequence is considered to have an INDEX of 0 (not 1) by convention. For example, the sequence 0, 2, 4, 6, 8, 10, ... can be represented by the computational procedure (* 2 INDEX). That is, the value of the sequence for position INDEX of the sequence is 2 times the INDEX.

This problem of sequence induction, of course, has no strictly mathematical solution. Nonetheless, we can evaluate proffered solutions according to how well they match the available known elements of the sequence. In this case, a higher value for the matching function is better. The known best value for the matching function is the value that occurs if all the available known elements of the sequence exactly match the result of executing the computational procedure under consideration.

Since many sequences are defined recursively (that is, earlier elements in the sequence are used to define later elements), it is desirable to have a function for referencing the value of the sequence for k positions earlier in the sequence than the current position (i.e. the position numbered INDEX). For example, it may be necessary to express $S_i$ in terms of $S_{i-1}$ (the previous element of the sequence) or in terms of $S_{i-k}$ (k elements earlier in the sequence). Note that if the value of k were zero, negative, or greater than INDEX, the attempted reference would be to values of the sequence which do not exist. For these non-existent positions, a default value should be defined for the function to make it complete. Thus, the referencing function should have two arguments. The first argument is k and the second argument is a default value. The referencing function is termed "&".

The function & (k, D) of the variables k and D returns the value of the sequence for position INDEX−k whenever INDEX−k lies between 0 and INDEX−1, and, otherwise, this function returns the default value D. For example, the sequence 2, 4, 8, 16, 32, ... can be represented by the computational procedure (* 2(& 1 1)) because the value of the sequence for position INDEX is generally 2 times the value of the sequence for position INDEX−1. Note that when INDEX is 0 (and a reference is attempted for sequence position −1), the value of the sequence is 2 times the default value of 1.

Similarly, for example, the Fibonacci sequenced $$1, 1, 2, 3, 5, 8, 13, 21, 34, 55, \ldots$$

may be expressed as $S_i = S_{i-1}$ (with the understanding that if $S_{i-2}$ or $S_{i-1}$ refer to sequence elements earlier than sequence element 0, a default value of 1 will be used). The Fibonacci sequence can also be represented by the doubly recursive computational procedure:

$$(+(\& \ 1 \ 1) \ (\& \ 2 \ 1))$$

Except for the special argument INDEX and except for the special referencing function & needed to allow references to the sequence itself, the process of sequence induction can proceed using the same functions available in LISP as were used for the linear equations example.

Figure 11:
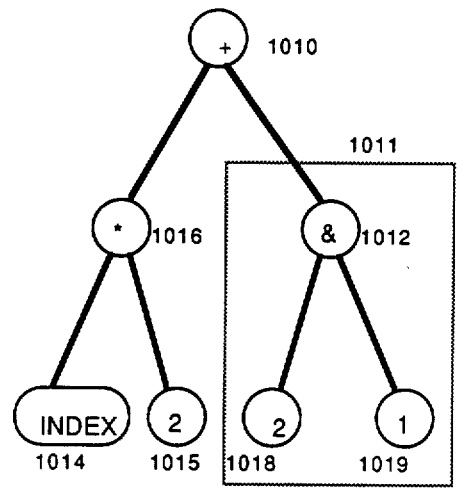
FIG. 11 is a tree diagram representation of a crossover operation of the Fibonacci series problem.
Figure 11:
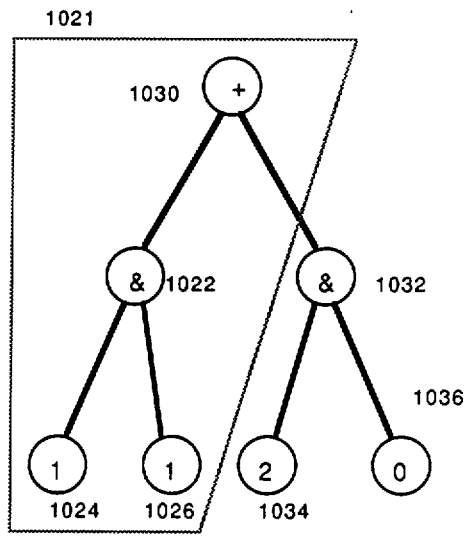
Figure 11:
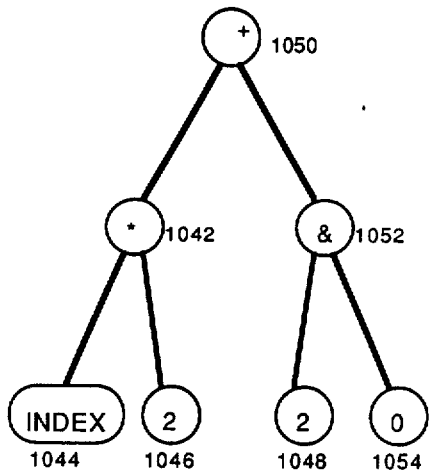
Figure 11:
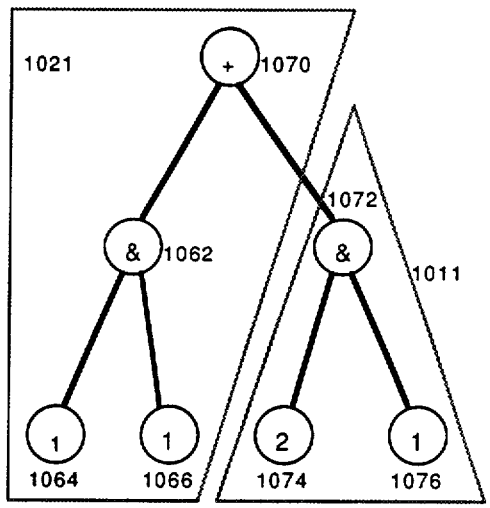

FIG. 11 illustrates the crossover operation applied to two parents whose functions and arguments include the special function & and the special argument INDEX appropriate for the sequence induction problem. The first parent is computational procedure 1000, (+(* INDEX 2) (& 2 1)), represented by the tree with root 1010. Root 1010 is the addition function and has lines to arguments at internal nodes 1016 and 1012. Node 1016 is the multiplication function and has lines to arguments at leafs 1014 and 1015 (the variable INDEX and the number 2, respectively). Node 1012 is the & (referencing) function and has lines to arguments at leafs 1018 and 1019 (the numbers 2 and 1, respectively). Sub-tree 1011 comprises 1012, 1018, and 1019. The argument INDEX appears as one of the arguments 1014 of the multiplication function (*) 1016. The referencing function & appears at internal point 1012 of the tree and operates on the arguments 1018 and 1019 (the numbers 2 and 1, respectively). This function (& 2 1) means give the value of the sequence 2 positions earlier in the sequence (or gives the default value 1 if the current position of the sequence is only 0 or 1). The second parent is computational procedure 1020, (+(& 1 1) (& 2 0)), represented by the tree with root 1030. Root 1030 is the addition function and has lines to arguments at internal nodes 1022 and 1032. Node 1022 is the & function and has lines to arguments at leafs 1024 and 1026 (the numbers 1 and 1). Node 1032 is the & function and has lines to arguments at leafs 1034 and 1036 (the numbers 2 and 0, respectively). Tree 1021 comprises 1030, 1022, 1024, and 1026. Internal point 1012 of the tree with root 1010 and internal point 1032 of the tree with root 1030 are chosen as the crossover points.

The first offspring 1040, (+(* INDEX 2) (& 2 0)), is represented by the tree with root 1050. Root 1050 is the addition function and has lines to arguments at internal nodes 1042 and 1052. Node 1042 is the multiplication function and has lines to arguments at leafs 1044 and 1046 (the variable INDEX and the number 2, respectively). Node 1052 is the & function and has lines to arguments at leafs 1048 and 1054 (the numbers 2 and 0, respectively).

The second offspring 1060, (+(& 1 1) (& 2 1)), represented by the tree with root 1070 is composed of tree 1021 of the second parent 1020 combined with the sub-tree 1011. Root 1070 is the addition function and has lines to arguments at internal nodes 1062 and 1072. Node 1062 is the & function and has lines to leafs 1064 and 1066 (the numbers 1 and 1). Node 1072 is the & function and has lines to leafs 1074 and 1076 (the numbers 2 and 1, respectively). This second offspring is the known correct solution to the problem of inducing the formula for the Fibonacci sequence.

It should be noted that the sequences involved here need not be deterministic sequences. Instead, they can be produced by probabilistic processes. For example, the sequence 0, 1, 2, 5, 4, 5, 8, 7, . . . might be generated by simply making the value of the sequence equal to INDEX 75% of the time and equal to (+INDEX 2) 25% of the time. For example, when INDEX is 0, 1, 2, 4, 5, and 7, the value of the sequence was 0, 1, 2, 4, 5, and 7, respectively. That is, the value of the sequence was equal to INDEX. But, when INDEX was 3 and 6, the value of the sequence was 5 and 8, respectively. That is, the value of the sequence was equal to INDEX plus 2. In these cases, the perfect matches will not be obtained; however, higher fitness levels will be associated with computational procedures that produce matches more often than others.

TRAVELING SALESPERSON PROBLEM

In this example problem, a salesperson is given a mileage chart with the distances between a specified number of cities and is required to visit each of the cities once (and return home) while covering the fewest miles. A tour of all the cities in the Traveling Salesperson Problem can be represented as permutation of the N cities where a permutation is understood to mean an ordered set of the cities such that each city appears exactly once in the ordered set. A partition of a set of N elements consists of a set of sub-sets such that each of the N elements from the original set is in exactly one of the sub-sets. For example, one possible partition of the set of 5 numbers (1, 2, 3, 4, 5) is the set consisting of the 2 subsets (1,5) and (2, 3, 4). The present invention approaches the Traveling Salesperson Problem in terms of partitioning the N cities into sub-tours. Thus, the representation of an entire tour of all the cities involves combining information about (1) the partition involved (i.e. how the N cities are divided into sub-tours), (2) the first and last city of each sub-tour, (3) and the order of the sub-tours.

Figure 12:
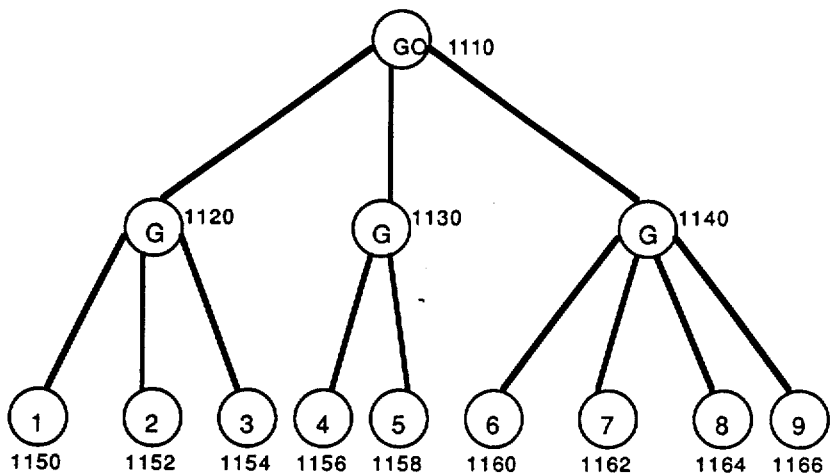
FIG. 12 is a tree diagram representation of tours and sub-tours of the Traveling Salesman problem.

The tree in FIG. 12 shows a representation of a tour of 9 cities. The LISP S-expression 1100, (GO (G 1 2 3) (G 4 5) (G 6 7 8 9)), specifies the entire tour, and is represented by a tree with root 1110. Root 1110 is the GO function and has three lines to internal nodes 1120, 1130, and 1140. Node 1120 is the G function and has lines to arguments at leafs 1150, 1152, and 1154 (representing cities 1, 2, and 3, respectively). Node 1130 is the G function and has lines to arguments at leafs 1156 and 1158 (representing cities 4 and 5, respectively). Node 1140 is the G function and has lines to arguments at leafs 1160, 1162, 1164, and 1166 (representing cities 6, 7, 8, and 9, respectively). Sub-tour 1120 of 3 cities begins at city 1, then visits city 2, and ends at city 3. Then a sub-tour 1130 of 2 cities begins at city 4 and ends at city 5. Finally, sub-tour 1140 of 4 cities begins at city 6, then goes to city 7, then to city 8, and ends at city 9.

The functions G and GO are LISP functions which take two arguments and return a result. The function G is the function for traversing a sub-tour. The execution of this function returns three values—the distance involved in the sub-tour, the first city, and the last city. The function GO is used as the outermost function. It returns only one value—namely, the distance of the entire tour. The function GO (unlike the function G) takes into account the distance involved for the final return home from the last city. The function GO at 1110 is at the root of the tree in FIG. 12.

Figure 13:
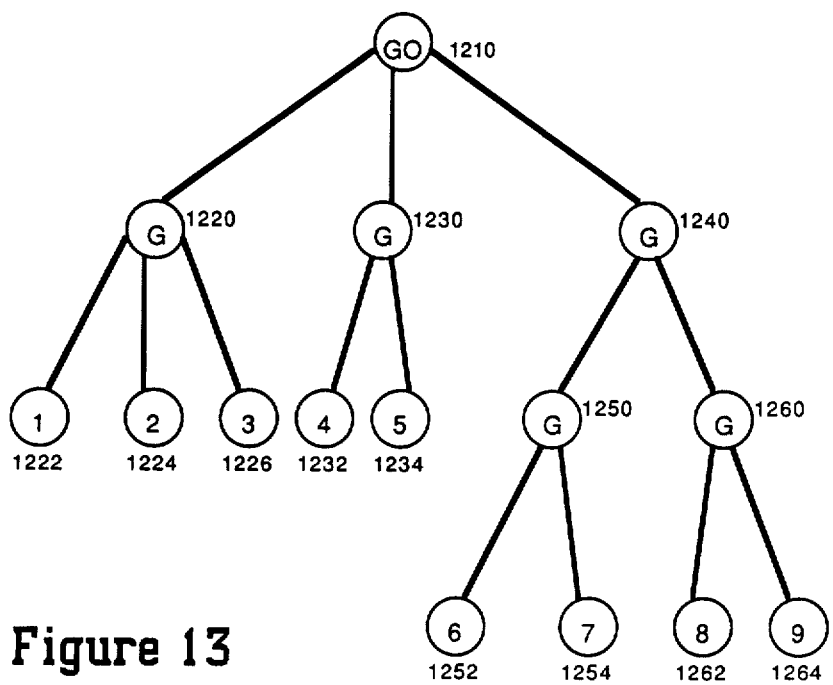
FIG. 13 is a tree diagram representation of sub-sub-tours of the Traveling Salesman problem.

If any of the sub-tours were itself composed of sub-tours, the function G would be used for the sub-sub-tours. FIG. 13 illustrates sub-sub-tours. S-expression 1200, (GO (G 1 2 3) (G 4 5) (G (G 6 7) (G 8 9))), is represented by a tree with root 1210. Root 1210 is the GO function and has lines to arguments at internal nodes 1220, 1230, and 1240. Node 1220 is the G function and has lines to arguments at leafs 1222, 1224, and 1226 (representing cities 1, 2, and 3, respectively). Node 1230 is the G function and has lines to arguments at leafs 1232 and 1234 (representing cities 4 and 5, respectively). Node 1240 is the G function and has lines to arguments at internal nodes 1250 and 1260. Node 1250 is the G function and has lines to arguments at leafs 1252 and 1254 (representing cities 6 and 7, respectively). Node 1260 is the G function and has lines to arguments at leafs 1262 and 1264 (representing cities 8 and 9, respectively).

In FIG. 13, 1250 is a sub-sub-tour involving cities 6 and 7 and 1260 is a sub-sub-tour involving cities 8 and 9. The distance involved in the entire tour 1200 in FIG. 13 is identical to the distance involved in the entire tour 1100 in FIG. 12. The difference is that the sub-sub-tours depict a different sub-substructure within the overall entire tour.

The specific arrangements and methods herein are merely illustrative of one application of the principles of this invention. Numerous modifications in form and detail may be made by those skilled in the art without departing from the true spirit and scope of the invention.

Thus, a genetic algorithm process for problem solving is described.

I claim:

1. A process for problem solving, using a population of entities of various sizes and shapes wherein each entity is a hierarchical arrangement of functions and arguments said process comprising iterations of a series of steps, each iteration comprising the steps:

activating each said entity to produce a result by performing each function in said hierarchical arrangement of functions and arguments;

assigning a value to each said result and associating each said value with a corresponding entity which produced each said result, said value indicative of the fitness of said corresponding entity in solving or partially solving a problem;

selecting at least one selected entity from said population using selection criteria, said selection criteria based on said value associated with each said entity, said selection criteria preferring each said entity having a relatively high associated value over each said entity having a relatively low associated value;

choosing and performing an operation, wherein said chosen operation is one of the operations of crossover or reproduction;

if said chosen operation is crossover, creating at least one new entity by crossover using a group of entities, said group of entities comprising said selected entity and at least one other entity from said population, such that any new entity created by crossover comprises at least a portion of said selected entity and at least a portion of said other entity, said new entity can differ in size and shape from said selected entity and said other entity;

if said chosen operation is reproduction, retaining said selected entity in said population such that said selected entity remains unchanged;

adding said new entity to said population.

2. The process as described in claim 1 wherein said step of selecting at least one selected entity further comprises selection criteria based on a probability that is, in most cases, proportional to said value associated with said entity.

3. The process as described in claim 1 wherein said step of choosing and performing an operation further comprising the operation of mutation such that if said chosen operation is mutation, a step of mutation occurs before said adding step, wherein said selected entity is mutated, such that at least one portion of said selected entity is replaced by a randomly generated portion to produce a new entity having portions of said selected entity and randomly generated portions.

4. The process as described in claim 1 further comprising a step of removing at least one entity having a relatively low associated value.

5. The process as described in claim 1 further comprising the step of maintaining an audit trail for recording the hereditary information of said population.

6. In the process as described in claim 1 wherein said step of choosing and performing an operation further comprising the operation of permutation, such that if said chosen operation is permutation, a step of permutation occurs before said adding step, wherein said selected entity is permuted, such that portions of each said selected entity are reordered to create at least one new entity from said selected entity.

7. The process as described in claim 1 wherein an individual entity in said population attaining a pre-established value of fitness with respect to solving the problem is designated as the solution to the problem.

8. The process as described in claim 1 wherein a set of entities from said population collectively attaining a pre-established average value of fitness with respect to solving the problem is designated as the solution to the problem.

9. The process as described in claim 1 wherein the initial population of entities is created by randomly generating entities of various sizes and shapes, said entities consisting of hierarchical arrangements of the functions and arguments available for the problem.

10. In a computer system having a population of programs of various sizes and structures, an iterative process for problem solving comprising iterations of a series of steps, each iteration of said process comprising the steps:

executing each said program to produce a result;

assigning a value to each said result and associating each said value with a corresponding program which produced each said result, said value indicative of the fitness of said corresponding program in solving or partially solving a problem;

selecting at least one selected program from said population using selection criteria, said selection criteria based on said value associated with each said program, said selection criteria preferring each said program having a relatively high associated value over each said program having a relatively low associated value;

choosing and performing an operation, wherein said chosen operation is one of the operations of crossover or reproduction;

if said operation is crossover, creating at least one new program by crossover using a group of programs, said group of programs comprising said selected program and at least one other program from said population, such that any new program created by crossover comprises at least a portion of said selected program and at least a portion of said other program, said new program can differ in size and structure from said selected program and said other program;

if said chosen operation is reproduction, retaining said selected program in said population such that said selected program remains unchanged;

adding said new program to said population.

11. The process as described in claim 10 wherein said step of selecting at least one selected program further comprises selection criteria based on a probability that is, in most cases, proportional to said value associated with said program.

12. The process as described in claim 10 wherein said step of choosing and performing an operation further comprises the operation of mutation such that if said chosen operation is mutation, a step of mutation occurs before said adding step, wherein said selected program is mutated, such that at least one portion of said selected program is replaced by a randomly generated portion to produce a new program having portions of said selected program and randomly generated portions.

13. The process as described in claim 10 further comprising a step of removing at least one program having a relatively low associated value.

14. The process as described in claim 6 wherein said operation of crossover further comprises removing said group from said population.

15. The process as described in claim 10 wherein said operation of crossover further comprises taking sub-procedures from at least one said selected program and at least one other program to create a new program, said new program is created solely from sub-procedures of said selected program and sub-procedures of said other program, said new program can vary in size and shape from said selected program and said other program.

16. The process as described in claim 10 further comprising the step of maintaining an audit trail for recording the hereditary information of said population.

17. In the process as described in claim 10 wherein said step of choosing and performing an operation further comprising the operation of permutation, such that if said chosen operation is permutation, a step of permutation occurs before said adding step, wherein said selected program is permuted, such that portions of each said selected program are reordered to create at least one new program from said selected program.

18. The process as described in claim 17 wherein said operation of permutation further comprises permuting a program by rearranging the sub-procedures of said program.

19. The process as described in claim 17 wherein said operation of permutation further comprises permuting a program by rearranging the arguments of the sub-procedures of said program.

20. The process as described in claim 17 wherein said operation of permutation further comprises permutating a program by rearranging the arguments of the sub-procedures of said program and the sub-procedures of said program.

21. The process as described in claim 17 wherein said operation of permutation further comprises permuting a program by redistributing the arguments of all the sub-procedures of said program amongst all the sub-procedures, and reordering the sub-procedures of said program.

22. The process as described in claim 10 wherein an individual program in said population attaining a pre-established value of fitness with respect to solving the problem is designated as the solution to the problem.

23. The process as described in claim 10 wherein a set of programs from said population collectively attaining a pre-established average value of fitness with respect to solving the problem is designated as the solution to the problem.

24. The process as described in claim 10 wherein the initial population of programs is created by randomly generating programs of various sizes and structures, said programs consisting of hierarchical programming structures, said hierarchical programming structures consisting of the functions and arguments available for the problem.

25. In a parallel processing computer system having a population of of various sizes and structures and wherein more than one program can be executed simultaneously, a group of parallel processes for problem solving wherein more than one parallel process of said group of parallel processes can be performed simultaneously, each parallel process of said group of parallel processes comprising iterations of a series of steps, each iteration of each said parallel process comprising the steps:

executing each said program to produce a result;
assigning a value to each said result and associating each said value with a corresponding program which produced each said result, said value indicative of the fitness of said corresponding program in solving or partially solving a problem;
selecting at least one selected program from said population using selection criteria, said selection criteria based on said value associated with each said program, said selection criteria preferring each said program having a relatively high associated value over each said program having a relatively low associated value;
choosing and performing an operation, including:
crossover, wherein at least one new program is created by crossover using a group of programs, said group of programs comprising said selected program and at least one other program from said population, such that any new program created by crossover comprises at least a portion of said selected program and at least a portion of said other program, said new program can differ in size and structure from said selected program and said other program;
reproduction, wherein said selected program is retained in said population such that said selected program remains unchanged;
adding said new program to said population.

26. The process as described in claim 25 wherein said step of choosing and performing an operation further comprising the operation of mutation which occurs before said adding step, wherein said selected program is mutated, such that at least one portion of said selected program is replaced by a randomly generated portion to produce a new program having portions of said selected program and randomly generated portions.

27. The process as described in claim 25 wherein said step of choosing and performing an operation includes performing one of said operations for each of said parallel processes and all said parallel processes operate on said population.

28. The process as described in claim 25 wherein each of said parallel processes operate on a separate sub-population of said population, said process including a step of periodically intermixing sub-populations of said population.

29. The process as described in claim 25 wherein said step of choosing and performing an operation includes performing one of said operations for each of said parallel processes and each of said parallel processes operate on a separate sub-population of said population, said process including a step of periodically intermixing sub-populations of said population.

30. The process as described in claim 25 further comprising the step of maintaining an audit trail for recording the hereditary information of said population.

31. In the process as described in claim 25 wherein said step of choosing and performing an operation further comprising the operation of permutation, such that if said chosen operation is permutation, a step of permutation occurs before said adding step, wherein said selected program is permuted, such that portions of each said selected program are reordered to create at least one new program from said selected program.

32. The process as described in claim 25 wherein an individual program in said population attaining a pre-established value of fitness with respect to solving the problem is designated as the solution to the problem.

33. The process as described in claim 25 wherein a set of programs from said population collectively attaining a pre-established average value of fitness with respect to solving the problem is designated as the solution to the problem.

34. The process as described in claim 25 wherein the initial population of programs is created by randomly generating programs of various sizes and structures, said programs consisting of hierarchical programming structures, said hierarchical programming structures consisting of the functions and arguments available for the problem.

35. A computer system for problem solving comprising:

memory means for storing a population of entities of various sizes and shapes, wherein each entity is a hierarchical arrangement of functions and arguments;

processing means coupled to said memory means for retrieving said entities stored in said memory means, said processing means executes instructions determined by said retrieved entities;

means for assigning a value to results of executing instructions of said retrieved entities and associating each said value with a corresponding entity which produced each said result, said value indicative of the fitness of said corresponding entity in solving or partially solving the problem, said means for assigning a value coupled to said processing means;

means for selecting at least one selected entity from said population using selection criteria, said selection criteria based on said value associated with each said entity, said selection criteria preferring each said entity having a relatively high associated value over each said entity having a relatively low associated value, said means for selecting coupled to said processing means;

means for choosing and performing an operation on each said selected entity, said chosen operation is one of the operations of crossover or reproduction, said means for choosing and performing an operation coupled to said processing means, said means for choosing and performing an operation comprising:

means for performing the operation of crossover comprising creation of at least one new entity by crossover using a group of entities, said group of entities comprising said selected entity and at least one other entity from said population, such that any new entity created by crossover comprises at least a portion of said selected entity and at least a portion of said other entity, said new entity can differ in size and shape from said selected entity and said other entity;

means for performing the operation of reproduction comprising retention of said selected entity in said population such that said selected entity remains unchanged;

means for adding said new entity to said population of stored entities in said memory means for further execution by said processor, said means for adding coupled to said processing means.

36. The computer system as defined in claim 35, wherein said means for selecting at least one selected entity from said population using selection criteria further comprising selection criteria based on a probability that is proportional to said value associated with said entity.

37. The computer system as defined in claim 35 wherein said means for choosing and performing an operation further comprising the operation of mutation such that if said chosen operation is mutation, said selected entity is mutated, such that at least one portion of said selected entity is replaced by a randomly generated portion to produce a new entity having portions of said selected entity and randomly generated portions.

38. The computer system as defined in claim 35 wherein said means for selecting at least one selected entity further comprises removing at least one entity having a relatively low associated value when selecting said selected entity having a relatively high associated value.

39. The computer system as defined in claim 35 wherein said memory means can be used to store the status of all said selected and said removed entities.

40. The computer system as defined in claim 35 further comprising a plurality of said processing means for performing parallel operations on said population of said entities.

41. The computer system as described in claim 35 wherein said means for choosing and performing an operation further comprising the operation of permutation, such that if said chosen operation is permutation, said selected entity is permuted, such that portions of each said selected entity are reordered to create at least one new entity from said selected entity.

42. The computer system as described in claim 35 wherein said means for assigning a value further comprises designating an entity as a solution to a problem, wherein an individual entity in said population attains a pre-established value of fitness with respect to solving said problem.

43. The computer system as described in claim 35 wherein said means for assigning a value further comprises designating set of entities from said population as a solution to a problem, wherein said set of entities collectively attain a pre-established average value of fitness with respect to solving said problem.

44. The computer system as described in claim 35 wherein said population of entities stored in said memory means is initially created using means for randomly generating entities of various sizes and shapes, said means for randomly generating entities coupled to said processing means, said entities consisting of hierarchical arrangements of the functions and arguments available for the problem.

* * * * *